United States Patent
Fujieda et al.

[19]

[11] Patent Number: 5,872,826
[45] Date of Patent: Feb. 16, 1999

[54] FUEL ASSEMBLY CHANNEL BOX HAVING BURNABLE POISON

[75] Inventors: Tadashi Fujieda; Masahisa Inagaki, both of Hitachi; Iwao Takase, Tokai-mura; Yoshitaka Nishino, Hitachi; Junichi Yamashita, Hitachi; Akihiro Yamanaka, Hitachi; Kenichi Ito, Hitachinaka; Junjiro Nakajima; Takehiro Seto, both of Hitachi, all of Japan

[73] Assignee: Hitachi, Ltd., Tokyo, Japan

[21] Appl. No.: 882,335

[22] Filed: Jun. 25, 1997

[30] Foreign Application Priority Data

Jun. 26, 1996 [JP] Japan ................................ 8-166444

[51] Int. Cl.⁶ .................................................. G21C 3/30
[52] U.S. Cl. ........................... 376/447; 376/419; 376/444
[58] Field of Search ..................... 376/419, 444, 376/447

[56] References Cited

U.S. PATENT DOCUMENTS

| 3,663,366 | 5/1972 | Sauar | 376/447 |
| 4,626,404 | 12/1986 | Chubb | 376/447 |
| 5,416,813 | 5/1995 | Hiraiwa et al. | 376/419 |
| 5,629,964 | 5/1997 | Roberts | 376/447 |

FOREIGN PATENT DOCUMENTS

| 55-129790 | 10/1980 | Japan | 376/447 |
| 59-72087 | 4/1984 | Japan . | |
| 60-146185 | 8/1985 | Japan . | |
| 6-342091 | 12/1994 | Japan . | |

OTHER PUBLICATIONS

Abstract of JP 2–147985, Jun. 6, 1990.

*Primary Examiner*—Daniel D. Wasil
*Attorney, Agent, or Firm*—Fay, Sharpe, Beall, Fagan, Minnich & McKee

[57] ABSTRACT

A channel box for a nuclear-reactor fuel assembly (MOX fuel assembly) containing plutonium, capable of properly controlling the excess reactivity without mixing neutron absorber or burnable poison into a fuel rod, and a channel box for a nuclear-reactor fuel assembly which does not form any gap between the channel box and members containing burnable poison in the channel box and in which the burnable poison does not directly contact with reactor water.

26 Claims, 23 Drawing Sheets

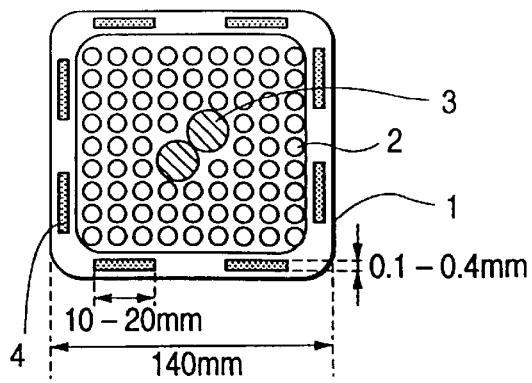
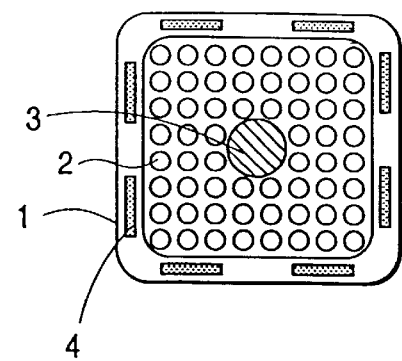
FIG. 1(a)
FIG. 1(c)
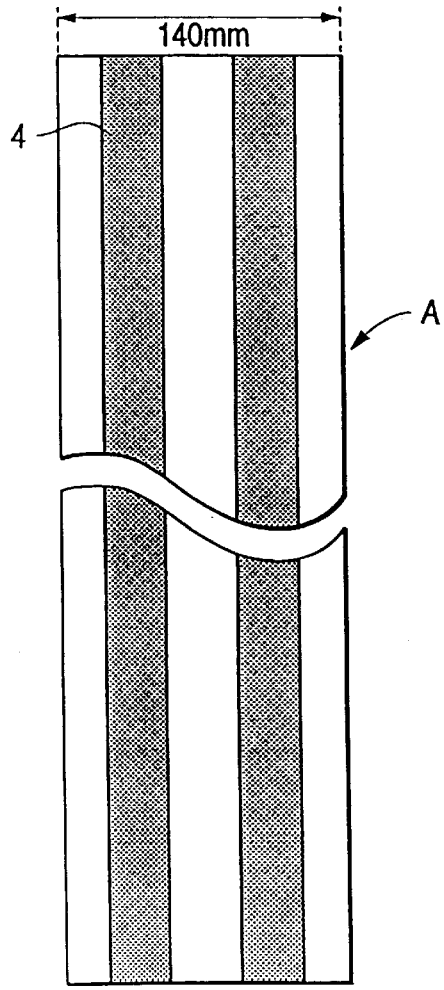
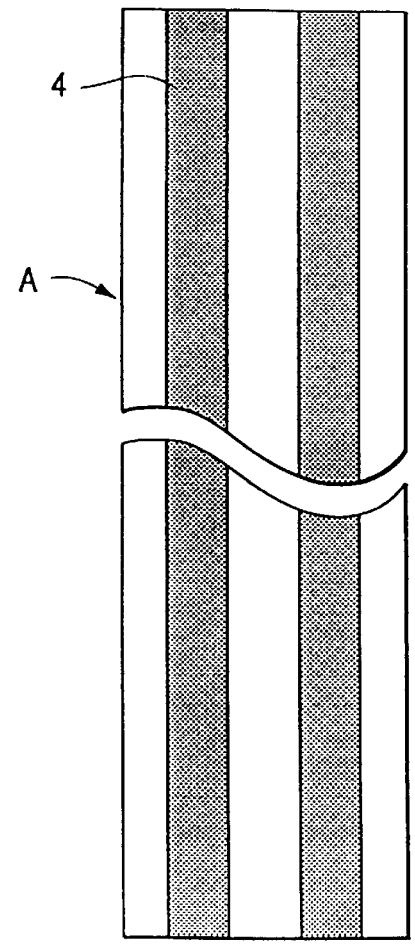
FIG. 1(b)
FIG. 1(d)

80-100% OF
EFFECTIVE LENGTH
OF FUEL

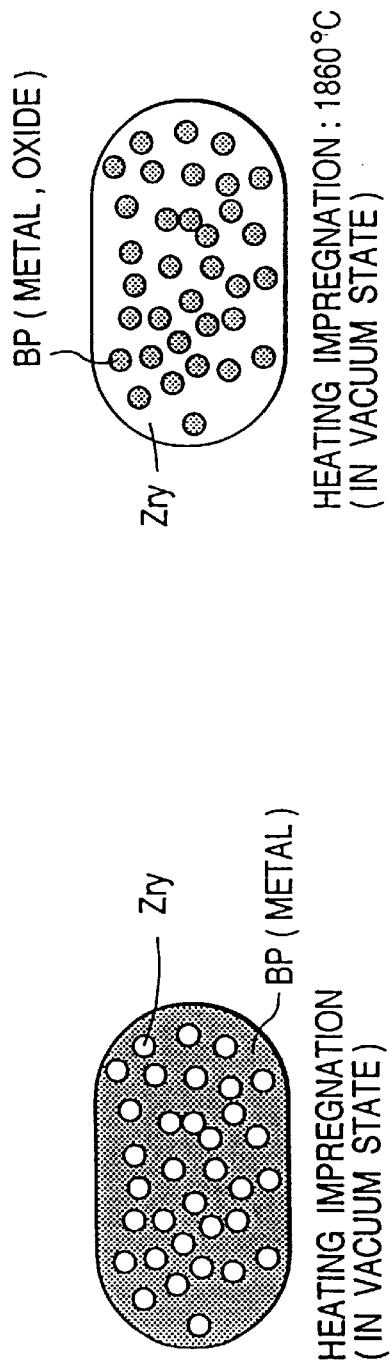
FIG. 12(a)
FIG. 12(b)
FIG. 12(c)
FIG. 12(d)

DOUBLE STRUCTURE

TRIPLE STRUCTURE

FUEL ASSEMBLY CHANNEL BOX HAVING BURNABLE POISON

FIELD OF THE INVENTION

The present invention relates to a fuel assembly for a nuclear power plant and particularly, to a fuel assembly for improving the economical efficiency of nuclear fuel by controlling output peaking and reducing nuclear thermal restrictions.

DESCRIPTION OF THE PRIOR ART

In the case of a conventional nuclear reactor, a fissile material represented by uranium 235 is sealed in a fuel rod and burned to take out and use the burnup energy. The fissile material sealed in the fuel rod generally uses enriched uranium obtained by enriching natural uranium. The enriched uranium is formed into a fuel pellet, sintered in a uranium dioxide sintered state, put in fuel cladding tubes arranged like a square checkerboard and used.

A PLUTHERMAL project in which plutonium contained in used uranium fuel taken out of a light-water reactor is recycled and reused in a light-water reactor has been recently progressed in order to effectively use uranium resources. In the case of this project, MOX (Mixed Oxide) fuel assemblies obtained by replacing some or most of the uranium fuel rods in uranium fuel assemblies with MOX fuel rods obtained by enriching plutonium are loaded into a light-water reactor as its fuel and used.

In this case, it is desirable that the characteristics of the MOX fuel assembly is close to that of uranium fuel. Moreover, because the design of uranium fuel tends to have a high burn-up and therefore, it is desirable to design a high-enrichment MOX fuel, that is, to maximize the loaded amount of plutonium per fuel assembly. However, when increasing the plutonium loading content in an MOX fuel assembly, a difference is produced between a uranium core and a plutonium core from the viewpoint of the reactor core characteristics due to the difference of nuclear characteristics between uranium and plutonium. That is, the neutron flux spectrum of MOX fuel becomes harder than that of uranium fuel because the thermal neutron absorption cross sections of Pu-239 and Pu-241 which serve as fissile materials are larger than that of U-235 and the neutron resonance absorption by Pu-240 is large, and therefore the neutron slowing down effect is deteriorated.

In the case of a nuclear reactor, the reactor core is designed to have an excess reactivity so that the reactor can be operated for a certain operation period. To control the excess reactivity, a burnable poison (BP) represented by gadolinium is mixed into a fuel rod in its design. Also in the case of a nuclear reactor using MOX, the excess reactivity is controlled by using a plurality of fuel rods obtained by mixing burnable poison into fuel.

In general, the thermal neutron absorption cross section has a 1/v dependence on neutron energy and there is a tendency that a neutron with a lower energy is more easily absorbed. Therefore, the absorbed quantity of neutrons by burnable poison increases as the neutron spectrum energy becomes soft, that is, as the system has more thermal neutrons. Therefore, the reactivity control effect by burnable poison lowers in a nuclear reactor core using MOX. Therefore, to obtain a reactivity control effect equivalent to the that of a uranium core, it is necessary to increase the number of fuel rods used and containing burnable poison. To cope with the above, it is considered to use the technique disclosed in Japanese Patent Laid-Open No. 146185/1985. This technique improves the reactivity value of gadolinium, decreases the number of gadolinium-contained fuel rods to be used, increases the plutonium inventory of a fuel assembly, and decreases the number of types of pellets used by noticing the importance of the fact that the outer peripheries of the fuel assemblies close to a water gap have a lot of thermal neutrons and the soft neutron spectrum is soft and arranging the gadolinium-contained fuel rods in the outer periphery.

However, the above method cannot completely remove the burnable poison from the fuel in a fuel assembly and therefore, there arises a problem that the method is insufficient from the viewpoint of reducing plutonium inventory.

It is considered to solve the above problem by the techniques disclosed in Japanese Patent Laid-Open Nos. 129790/1980 and 72087/1984. The latter techniques makes it possible to add burnable poison to a fuel pellet or make adjustment of uranium enrichment unnecessary by removably providing a reactivity control member to the outer periphery of the fuel channel box of a fuel assembly. In this case, the reactivity control member is a neutron absorber such as stainless steel or zirconium alloy, a member obtained by dispersing burnable poison such as gadolinium, silver, indium, boron, cadmium, or hafnium into stainless steel in the form of a simple substance or compound or cladding the burnable poison with stainless steel, a member obtained by cladding a reflector such as beryllium with stainless steel, or a member subjected to co-extrusion in which the above neutron poison, reflector, or natural or depleted uranium is sandwiched between stainless steel and rolled.

Moreover, the technique disclosed in Japanese Patent Laid-Open No. 342091/1994 is proposed for the above problem. This is a technique for forming a slowing-down material rod loaded at the center of a channel box into a double tube of outside and inside tubes and providing burnable poison between the inside and outside tubes.

In the case of the technique disclosed in Japanese Patent Laid-Open No. 72087/1984, however, a gap is produced between the channel box and the reactivity control member and therefore, crevice corrosion or galvanic corrosion easily occurs. Moreover, because the reactivity control member directly contacts with reactor water, the reactivity control member may be corroded.

Furthermore, as described above, burnable poison is mixed in a nuclear reactor fuel in order to control the initial extra reactivity. As the result of comparison of the dependence of the absorbing cross section of uranium on the neutron energy with that of plutonium on the neutron energy, it is found that plutonium absorbs more neutrons, as shown in FIG. 22. Therefore, when using plutonium for a light-water reactor, the number of thermal neutrons absorbed by a reactivity control substance such as control rod material or burnable poison decreases, the control rod value or reactivity value of burnable poison lowers in the case of a reactor core loaded with MOX fuel assemblies and therefore, it is necessary to increase the number of fuel rods used containing burnable poison in the case of the reactor core loaded with MOX fuel assemblies.

This means that the plutonium inventory per fuel assembly decreases and resultingly, the number of fuel assemblies to be manufactured for the consumption of the same amount of plutonium is increased. This causes the fuel manufacturing cost and the fuel transport cost to increase.

Moreover, the nuclear reactor fuel must be so designed as to keep the local peaking coefficient at a proper value during the fuel service life and observe the thermal operation restriction value in order to maintain the soundness of the fuel. In general, in the case of a boiling-water nuclear reactor, a thermal neutron flux relatively increases at the outer periphery of a fuel assembly, that is, at the position close to the water gap and the output of fuel rods at the outer periphery tends to increase. Therefore, it is necessary to design the nuclear reactor fuel by increasing the number of types of enrichment and enrichment factors of a pellet in order to decrease the local peaking coefficient of fuel rods arranged at the outer periphery of the fuel assembly. It can be said that the technique disclosed in Japanese Patent Laid-Open No. 342091/1994 is not enough to solve the above problem because burnable poison is loaded at the center of the channel box.

To manufacture MOX fuel, a fuel pellet is formed in a fully-closed vessel. Therefore, cleaning of a glove box when changing the enrichment of plutonium requires a lot of time compared to the case of uranium and therefore, the working ratio of manufacturing the MOX fuel is greatly lowered. Therefore, when the number of types of enrichment increases, there arises a problem that the clean-up frequency increases and resultingly, the fuel forming cost increases.

SUMMARY OF THE INVENTION

The present invention has been made to solve the above problems and its object is to provide a channel box of a fuel assembly for a nuclear reactor capable of properly controlling the excess reactivity without mixing a neutron absorber or burnable poison into fuel rods of a fuel assembly (MOX fuel assembly) containing plutonium.

To achieve the above object, a fuel assembly of the present invention is provided with a fuel rod bundle in which a plurality of nuclear fuel rods containing uranium or plutonium and a channel box enclosing the fuel rod bundle, in which the channel box is provided with burnable poison and the burnable poison is embedded so that the burnable poison does not directly contact with reactor water, or coated with metal having a corrosion resistance higher than that of the burnable poison so that the burnable poison does not directly contact with the reactor water.

Moreover, in a fuel assembly provided with a water rod, the water rod is provided with burnable poison, and the burnable poison is coated with metal having a corrosion resistance higher than that of the burnable poison so that the burnable poison does not directly contact with reactor water. The metal is, for example, zircaloy and as the above zircaloy it is preferable to use zircaloy 4 to be mentioned later.

In a specific mode of the present invention, the burnable poison of the channel box and water rod is made of a metal, alloy, intermetallic compound, or ceramic and the metal, alloy, intermetallic compound, or ceramic contains at least one of cadmium, samarium, boron, gadolinium, silver, indium, and hafnium. It is preferable that the burnable poison is made of circonium or zircaloy and the content is preferably 10 wt. % or less.

Furthermore, the burnable poison is made of metal, alloy, intermetallic compound, or ceramic obtained by adding at least one of cadmium, samarium, boron, gadolinium, silver, indium, and hafnium to zirconium or zirconium-base alloy as an alloying element to form a solid solution containing the added element in a dispersed or supersaturated state in the form of at least one of metal, intermetallic compound, oxide, hydride, and nitride.

Furthermore, as a mode of arrangement of burnable poison in the channel box of a fuel assembly of the present invention, the burnable poison is provided unevenly in the cross section of the channel box viewed from its longitudinal direction, more nearby the corners of the box symmetrically, unevenly in the longitudinal direction of the box, more at the bottom of the box and less at the top of the box in its longitudinal direction.

Furthermore, as a method of the present invention for manufacturing the channel box of the above fuel assembly, a recess is formed in one material plate of the channel box, a burnable poison plate is placed in the recess, the other material plate of the channel box is joined to the former material plate so that the burnable poison is embedded in the two material plates, the material plates are hot-rolled or hot-pressed without electron-beam-welding or welding the joints, and thereafter they are repeatedly cold-rolled and annealed a proper number of times. As another mode of the method of the present invention, a burnable poison plate is set between two material plates of a channel box and repeatedly hot-roll and contact-bond these three plates a proper number of times without electron-beam-welding or welding.

The fuel assembly of the present invention constituted as described above makes it possible to decrease or eliminate the amount of gadolinium contained in the fuel and reduce the local peaking coefficient of a fuel assembly by providing neutron absorber or burnable poison in the fuel channel box of a fuel assembly used for a boiling-water nuclear reactor.

Reactivity control and lowering of the local peaking coefficient by providing a BP member serving as neutron absorber or burnable poison in a channel box, particularly by using $Gd_2O_3$ as the BP member will be described below.

FIG. 23 shows the change of the control value resulting from the neutron dose. From FIG. 23, it can be seen that $Gd_2O_3$ is optimum as a material for controlling the initial excess reactivity, that is, the reactivity of the first cycle (dose:$\approx 1.0 \times 10^{22}$nvt). Moreover, in a fuel assembly, the number of thermal neutrons in the fuel assembly is more than in the water gap portion and the neutron spectrum also becomes softer. This is caused by the two factors that the amount of water in the fuel assembly is relatively more than in the outer periphery and thermal neutrons are absorbed by the fissile material in the fuel assembly.

Burnable poison and neutron absorber have a neutron-absorbing sectional area with a dependence of 1/v as shown in FIG. 24 and the reactivity control effect increases as the number of thermal neutrons increases. In the MOX fuel, because plutonium absorbs neutrons more than uranium, the neutron spectrum in a fuel assembly becomes harder and the reactivity control effect of burnable poison decreases. Therefore, it is possible to heighten more the reactivity control effect by providing burnable poison at a water gap portion, that is, in a channel box than by mixing the burnable poison into the fuel.

Moreover, referring to FIGS. 15(*a*) and 15(*b*) showing the thermal-neutron flux distribution in a fuel assembly, thermal neutrons increase at the outer periphery of the fuel assembly including a relatively larger amount of water but the thermal neutron bundles decrease at the central portion of the fuel assembly. Therefore, the local peaking coefficient also tends to increase at the outer periphery of the fuel assembly. By mixing burnable poison or neutron absorber into a fuel channel box portion nearby the region where the local peaking coefficient increases, it is possible to effectively control the local peaking coefficient of the outer periphery of the fuel assembly.

Furthermore, the function of distributing burnable poison or neutron absorber in the longitudinal direction of a channel box will be described below.

In a boiling-water nuclear reactor, cooling water boils in the core of the nuclear reactor and flows from the bottom to the top of the nuclear reactor core. Therefore, water vapor bubbles (voids) are distributed in the axial direction of the nuclear reactor core and moreover, the number of voids tends to increase toward the top of the core. In a light-water-moderated nuclear reactor, the density of moderator (water) controls nuclear fission and the reactor is so designed that the nuclear fission is accelerated as the moderator density increases. Therefore, when considering the output distribution in the axial direction of the reactor core, the output tends to be high at the bottom of the reactor core where there are little voids compared to the top of the reactor core where there are more voids. It is possible to effectively cope with the above fact by distributing the amount of neutron absorber or burnable poison provided in the channel box so that it is large in the bottom region in the axial direction where the reactivity is high, and decreases toward the top region.

Moreover, because the neutron spectrum is hard in the top region in the axial direction because the voidity is high in the region, the depletion of burnable poison or neutron absorber tends to be slow compared to the bottom region. Therefore, by distributing the neutron absorber in the axial direction, the depletion in the axial direction uniformly progresses.

Furthermore, in the case of the present invention, burnable poison does not directly contact with reactor water because the burnable poison is embedded in a channel box or the burnable poison is coated with metal such as zircaloy. Therefore, the burnable poison does not corrode, or no crevis corrosion nor galvanic corrosion occurs between the burnable poison and the channel box.

Furthermore, the present invention makes it possible to constitute a neat channel box from which no burnable poison is exposed to the outside by embedding the burnable poison in material plates at the manufacturing step before the step of forming the channel box and moreover, easily manufacture a channel box in which burnable poison is embedded and prevent the undesirable phenomenons such as separation of material plates of the channel box from each other by using the channel box manufacturing method of the present invention.

From the above description, it can be understood that a fuel assembly (MOX fuel assembly) of the present invention containing plutonium makes it possible to properly control the excess reactivity without mixing neutron absorber or burnable poison into a fuel rod.

Moreover, because no burnable poison is mixed into fuel, it is possible to use plutonium for a light-water reactor without decreasing the loaded amount of plutonium per fuel assembly.

Furthermore, it is possible to reduce the local peaking of the outer periphery of a fuel assembly without increasing the number of types of pellet enrichment and thereby, decrease the number of types of enrichment of the pellets constituting the fuel assembly. Furthermore, by embedding burnable poison in a channel box or coating the burnable poison with metal such as zircaloy, the burnable poison does not corrode or crevis corrosion or galvanic corrosion does not occur between the burnable poison and the channel box and the burnable poison does not directly contact with reactor water. Therefore, it is possible to prevent the burnable poison from leaking into reactor water.

Furthermore, it is possible to form a neat channel box from which burnable poison is not exposed to the outside and moreover, easily manufacture a channel box in which burnable poison is embedded and prevent material plates of the channel box from separating from each other.

BRIEF DESCRIPTION OF THE DRAWINGS

FIGS. 1(a) and 1(d) are a sectional view and a side view of a burnable poison (BP)-member-embedded (nearby corners) channel box of the first embodiment of the present invention;

FIGS. 12a–12d are illustrations showing structures of a BP member of the present invention;

DESCRIPTION OF THE PREFERRED EMBODIMENTS

Figure 2A:
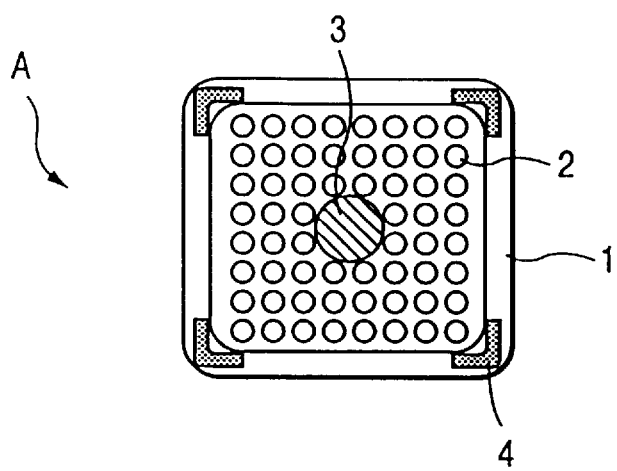
FIG. 2(a) and 2(b) are a sectional view and a side view of a BP-member-embedded (at corners) channel box of the second embodiment of the present invention.
Figure 2B:
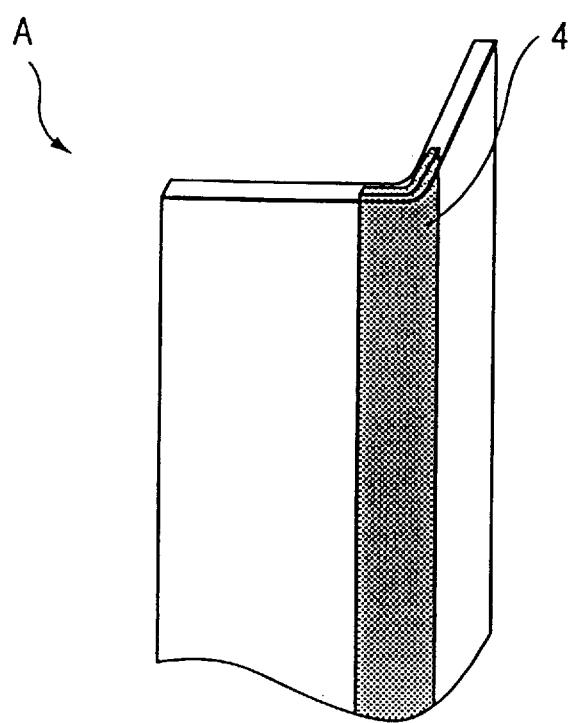

FIGS. 1(a) and 1(b) show the first embodiment of a fuel assembly A of the present invention, in which upper illustrations of FIGS. 1(a) and 1(b) are sectional views of channel boxes viewed from their longitudinal direction and lower illustrations are side views of the channel boxes viewed from their longitudinal direction. The MOX fuel assembly A comprises a channel box 1, a bundle of many fuel rods 2, one or two water rods 3, and BP members or sheets 4 containing burnable neutron absorbing poison (BP) provided in the members at the four laterals of the channel box 1. The BP member 4 is embedded nearby the corners of four laterals of the channel box 1 in its longitudinal direction. Two water rods 3 are used in FIG. 1(a) and one water rod 3 is used in FIG. 1(b). The other parts are the same in FIGS. 1(a) and 1(b). FIG. 2 shows the second embodiment in which BP members 4 are embedded at the corners of the laterals of a channel box 1 in its longitudinal direction. MOX fuel is made of uranium 238 fuel containing 1.5 to 10 wt. % of Pu. It is preferable to provided MOX fuel containing much Pu at the inside of the channel box and MOX fuel containing less Pu at the outside of the channel box.

Thus, by embedding the BP members 4 in the channel box 1, the BP members 4 do not directly contact with reactor water. Therefore, it is possible to prevent crevis corrosion and galvanic corrosion.

Moreover, by arranging the BP member 4 at and nearby the corners of the channel box 1, it is possible to effectively control the local peaking coefficient of the corners of the fuel assembly A.

Figure 26:
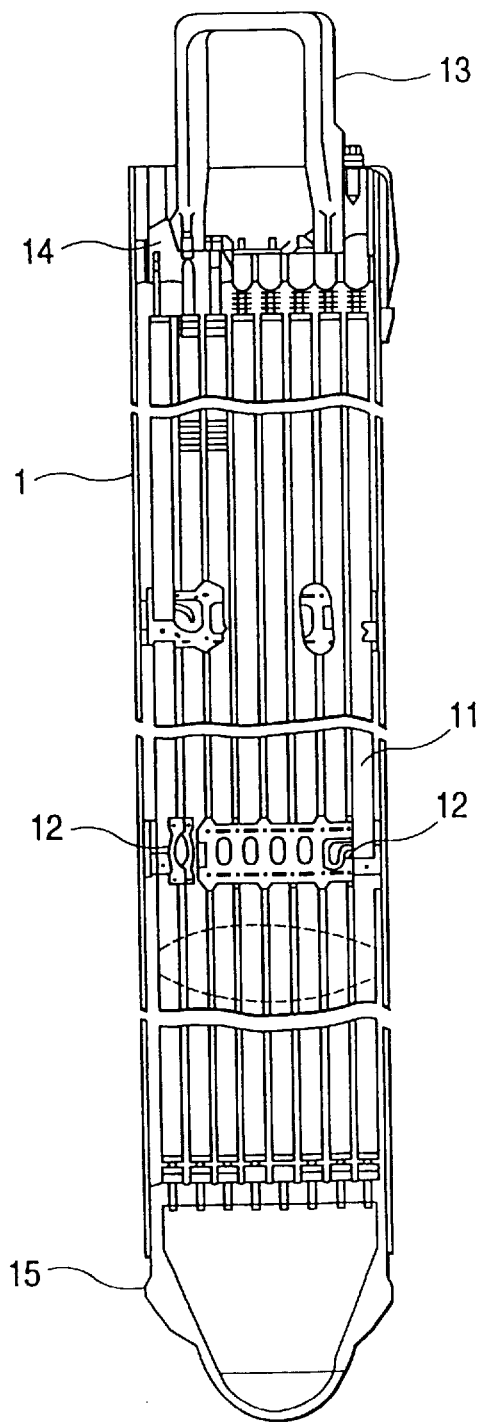
FIG. 26 is a partial sectional view of a BWR fuel assembly using a channel box.

FIG. 26 is a partial sectional view of a BWR fuel assembly using the above channel box. As shown in FIG. 26, the BWR fuel assembly comprises many fuel rods 11 and spacers 12 for holding the fuel rods at predetermined intervals, a prismatic channel box 1 for storing the fuel rods and the spacers, a top tie plate 14 for holding the upper ends of the fuel rods 11 having fuel pellets in fuel cladding tubes, a bottom tie plate 15 for holding the lower ends of the fuel rods 11, and a handle 13 for transferring the whole assembly.

Figure 3:
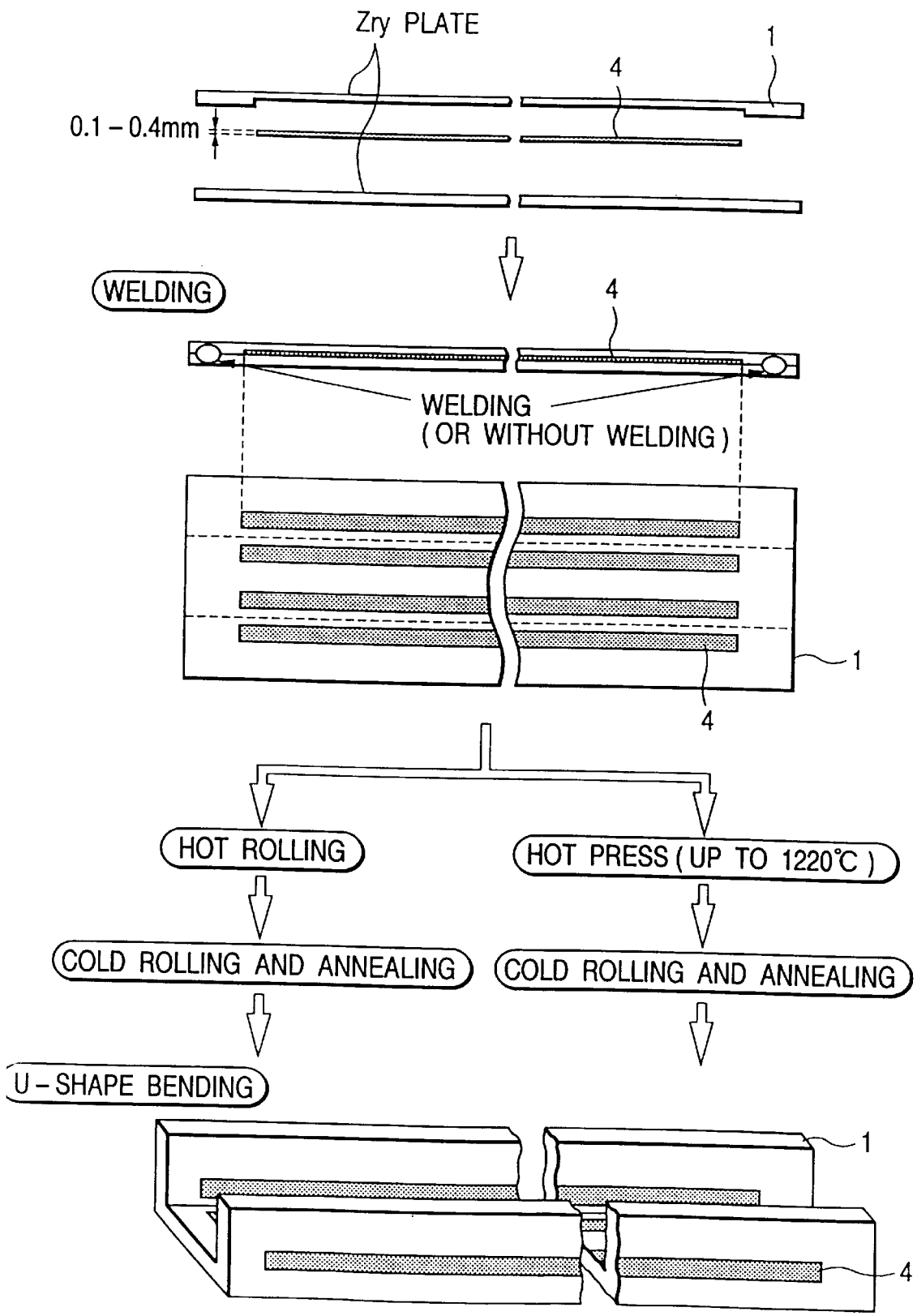
FIG. 3 is a block diagram showing a process (pre-stage process) for manufacturing the channel boxes of the embodiments of FIGS. 1 and 2.
Figure 4:
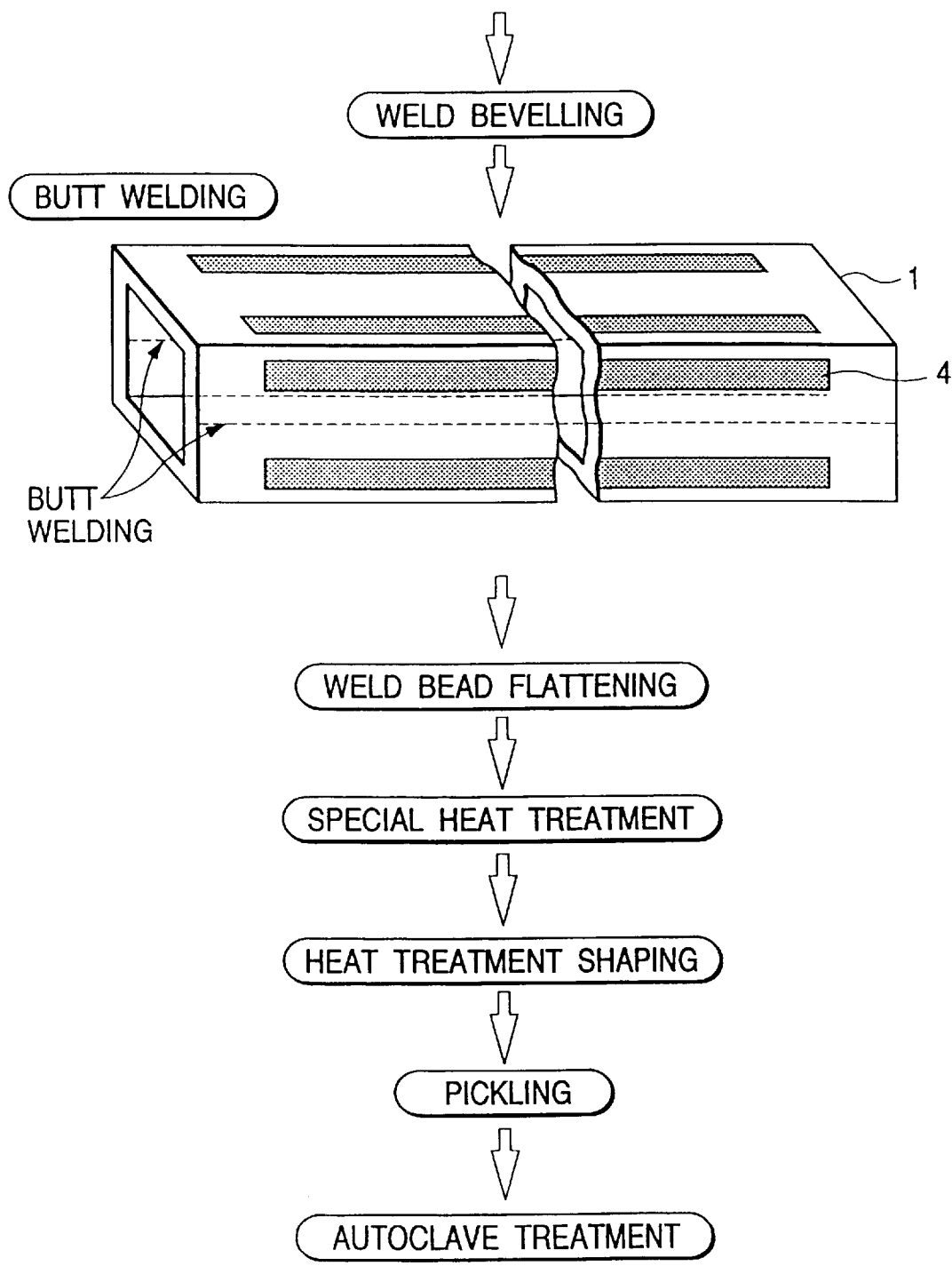
FIG. 4 is a block diagram showing a process (post-stage process) for manufacturing the channel boxes of the embodiments of FIGS. 1 and 2.
Figure 5:
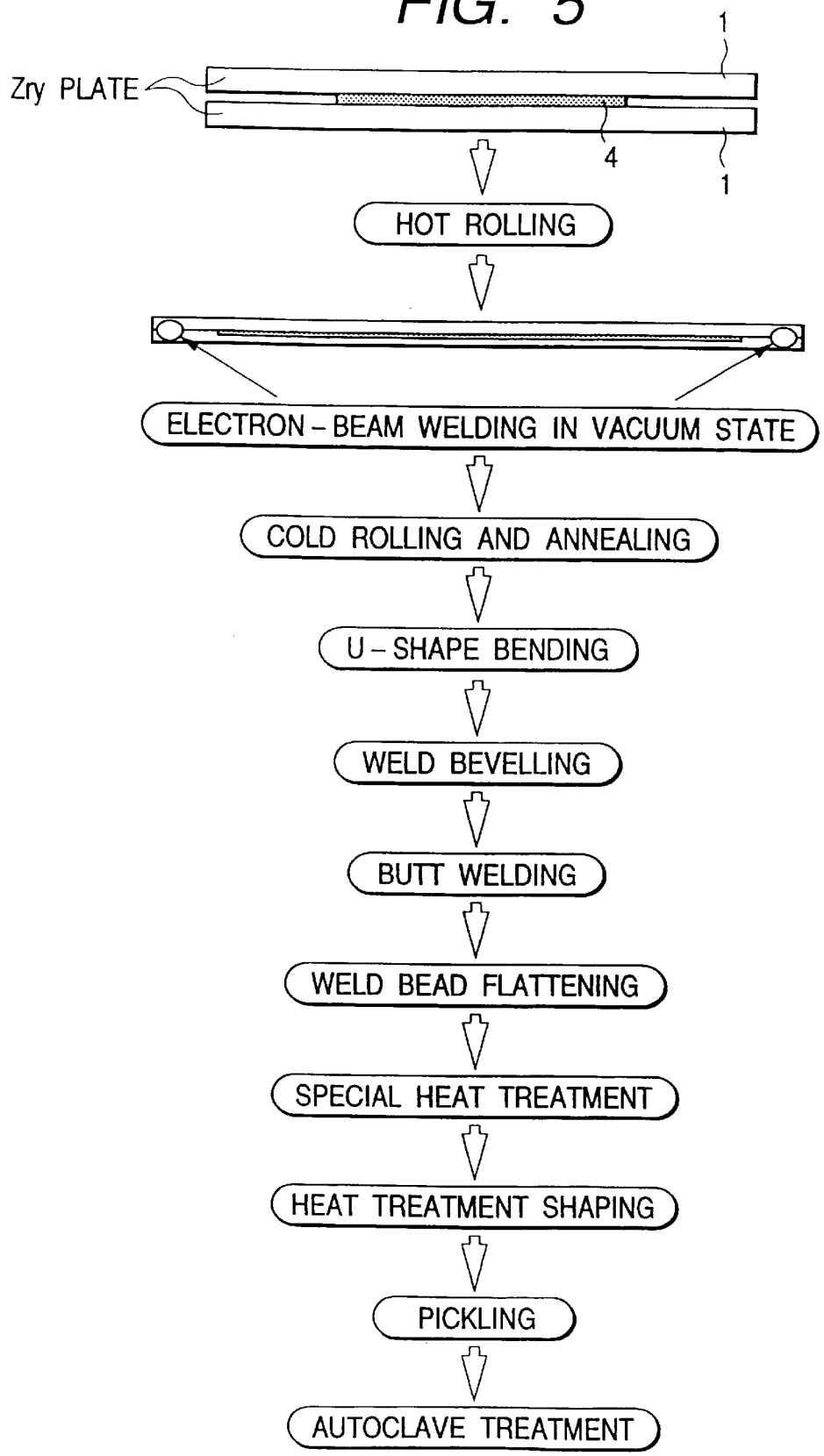
FIG. 5 is a block diagram showing another process for manufacturing the channel boxes of the embodiments of FIGS. 1 and 2.

FIGS. 3 to 5 show a method for manufacturing the channel box 1 of the fuel assembly A of the first embodiment. First, as shown in FIG. 3, a recess with a depth of 0.1 to 0.4 mm formed in a material plate made of zircaloy 4 serving as a channel box 1 in the longitudinal direction of the plate, a BP member 4 with the same size as that of the recess is fitted into the recess, and another thin zircaloy material plate is joined and electron-beam-welded in a vacuum state. Thereafter, they are hot-rolled, cold-rolled, and annealed several times at 600° to 700° C. to form a complete plate. In stead of using the hot rolling, there is a method of heating the above materials up to 1,220° C. and rolling them by hot press to form a plate. Moreover, when the materials are not separated from each other, it is possible to omit the electron-beam welding. Particularly, when rolling the materials by hot press, the electron-beam welding is often omitted. After forming the above one plate, the plate is bent to form a channel box 1 and two bent plates are butt-welded to form the rectangular channel box 1 and then, as shown in FIG. 4, the channel box 1 is completed by applying special heat treatment, heat-treatment shaping, and autoclave treatment to the channel box 1. The zircaloy 4 is a Zr-base alloy made of 1.20 to 1.70 wt. % of Sn, 0.18 to 0.24 wt. % of Fe, 0.07 to 0.13 wt. % of Cr, 0.10 to 0.16 wt. % of oxygen, and wt. % of residual Zr.

Moreover, as another method, as shown in FIG. 5 there is a method of hot-rolling a BP plate 4 sandwiched between material plates 1 and 1 made of zircaloy 4 at 600° to 700° C. to pressure-weld them and electron-beam-welding both ends of plates in a vacuum state and thereafter, repeatedly cold-rolling and annealing them to form one plate. Also in this case, unless the material plates 1 and 1 are separated from each other, it is possible to omit the electron-beam welding in a vacuum state. Moreover, it is assumed that the BP member 4 is completely clad with material 1 of zircaloy-4 (Zry) 1 and thus, it does not contact with the outside as shown in FIG. 5. Thereafter, a channel box is manufactured by passing it through the same conventional processes as those shown in FIGS. 3 and 4.

Figure 6A:
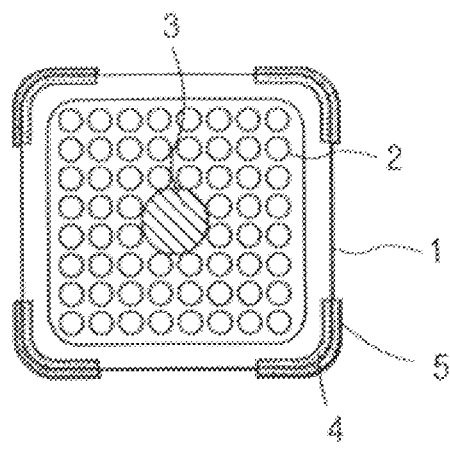
FIGS. 6(a) and 6(d) are a sectional view and a perspective view of a BP-member-embedded (at corners) channel box of the third embodiment of the present invention.
Figure 6C:
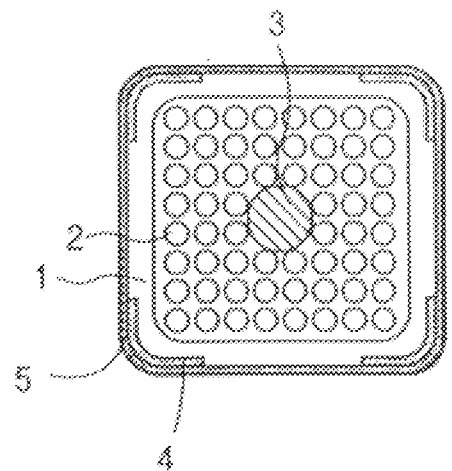
Figure 6B:
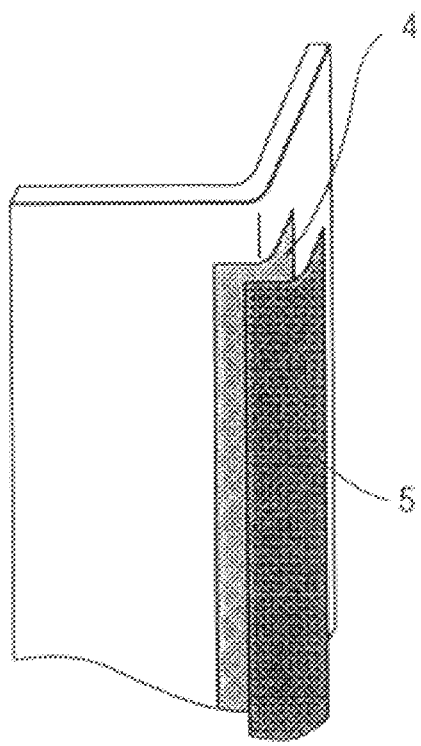
Figure 6D:
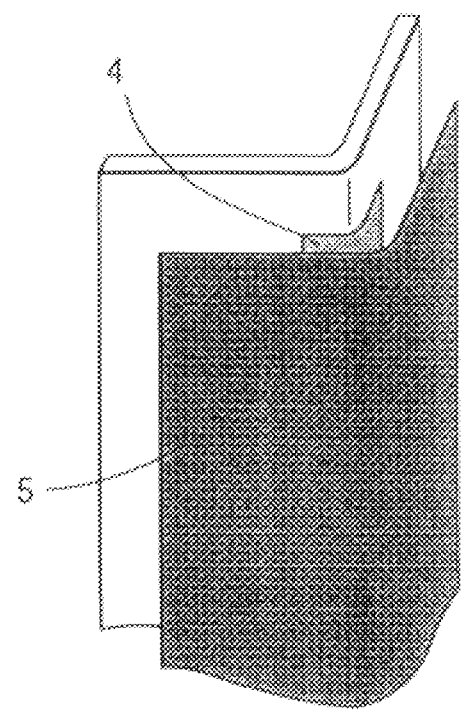

FIGS. 6(a) and 6(b) are the third embodiment constituted by fitting a BP member 4 into a recess of a channel box 1 and cladding the outside with a thin plate 5 made of zircaloy (Zry). That is, the third embodiment is constituted by forming a recess at and around a corner outside of the channel box 1 and fitting the BP member 4 into the recess and thereafter, cladding a part of or the whole lateral of the channel box 1 with the thin plate 5 made of Zry and welding them so that the BP member 4 does not directly contact with the reactor water.

FIG. 6(a) shows a case where the BP member 4 is provided at a corner of the channel box 1, in which only the outside of the BP member is clad with a thin plate 5 and FIG. 6(b) shows a case where the four laterals of the channel box 1 are clad with thin plates 5.

Figure 7A:
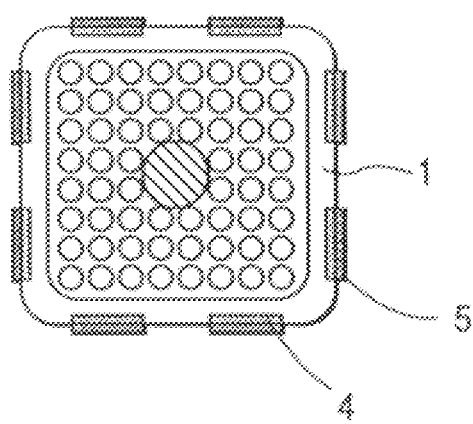
FIGS. 7(a) and 7(d) are a sectional view and a perspective view of a BP-member-embedded (at corners) channel box of the fourth embodiment of the present invention.
Figure 7C:
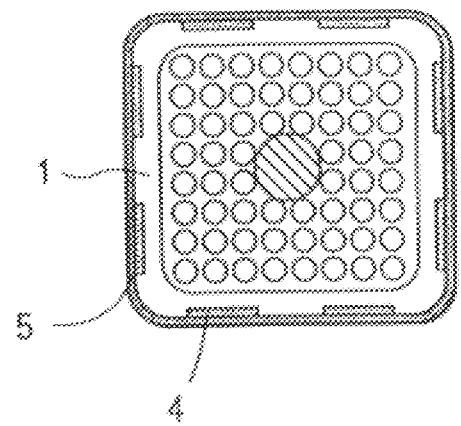
Figure 7B:
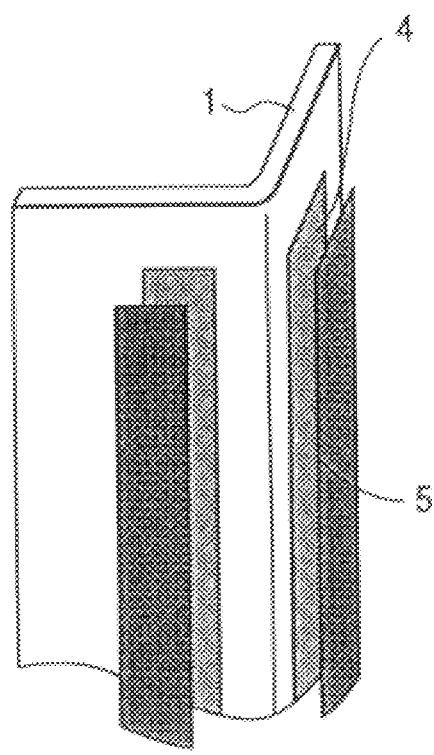
Figure 7D:
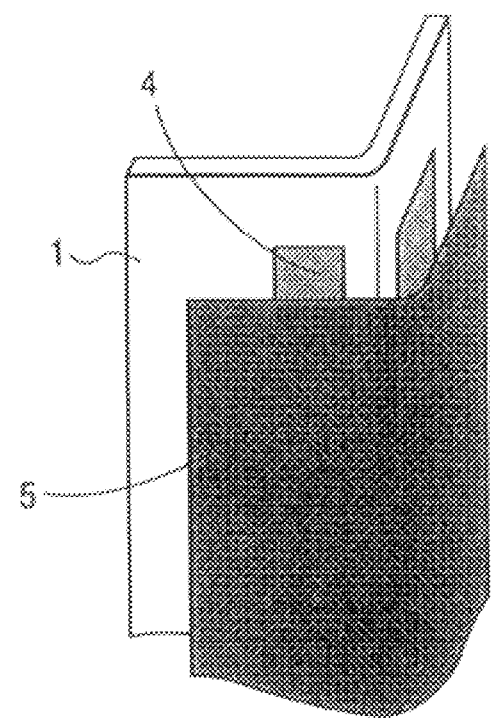

FIGS. 7(a) and 7(b) show the fourth embodiment constituted by providing BP members 4 nearby the corners. The other parts are the same as those of the embodiment of FIG. 6.

Moreover, when using a BP member 4 coated with another metal to be mentioned later, it is unnecessary to clad the member 4 with a thin plate made of Zry.

Figure 8A:
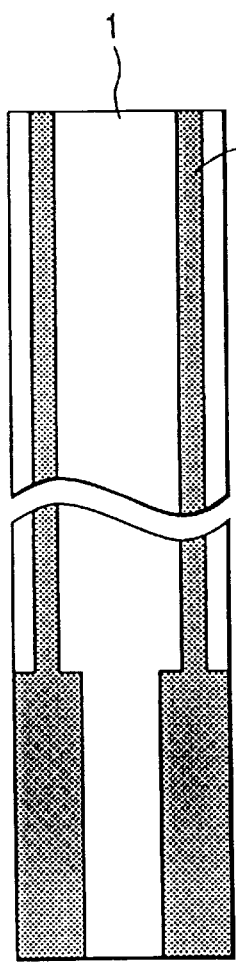
FIGS. 8(a) and 8(b) are side views showing structures for arranging BP members of another embodiment of the present invention in a channel box.
Figure 8B:
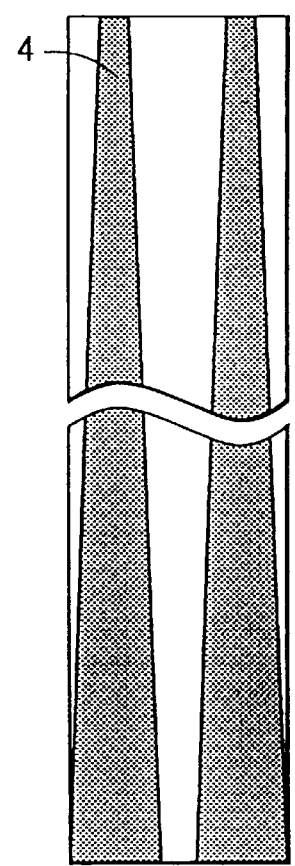

FIGS. 8(a) and 8(b) show shapes of a BP member 4, in which FIG. 8(a) shows a case where the width of the BP member 4 at the bottom of a channel box is great discontinuously in its longitudinal direction compared with the width at the top of the box and FIG. 8(b) shows a case where the width of the BP member 4 at its bottom is increased continuously in its longitudinal direction compared to the width at its top.

Figure 9:
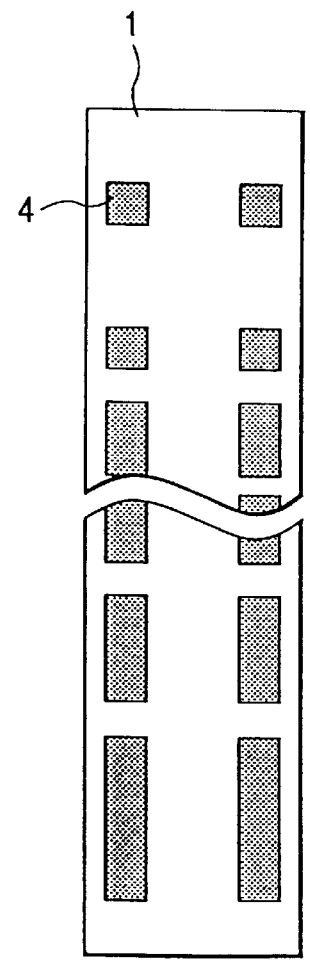
FIG. 9 is a side view showing a structure for arranging BP members of still another embodiment of the present invention in a channel box.
Figure 10:
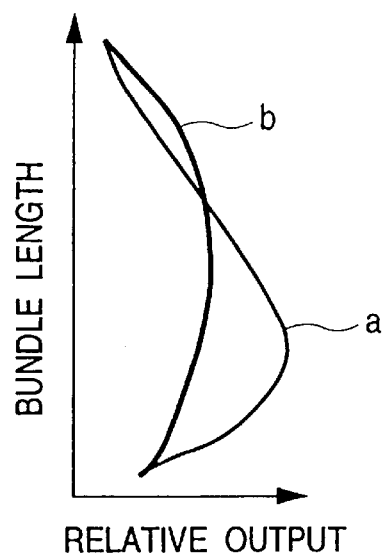
FIG. 10 is a diagram showing the output distributions in the axial direction of a reactor core.

FIG. 9 shows a case where a BP member 4 is divided in the longitudinal direction of a channel box 1. In this case, there are cases in which BP members 4 with an equal length are arranged at regular intervals and BP members 4 lengthened toward the bottom of the channel box 1 are arranged at narrow intervals. In this case, when considering the output distribution in the axial direction of a reactor core, the output distribution in the axial direction of the reactor core becomes large at the bottom of the reactor core where there are less voids compared to the top of the core where there are more voids as shown by curve "a" in FIG. 10 because water vapor bubbles (voids) are present in the axial direction of the core of the nuclear reactor and they increase toward the top of the reactor core. Therefore, as described above, by arranging less BP members 4 at the top and more BP members 4 at the bottom, it is possible to flatten the output distribution in the axial direction of the reactor core like a curve "b".

Figure 11:
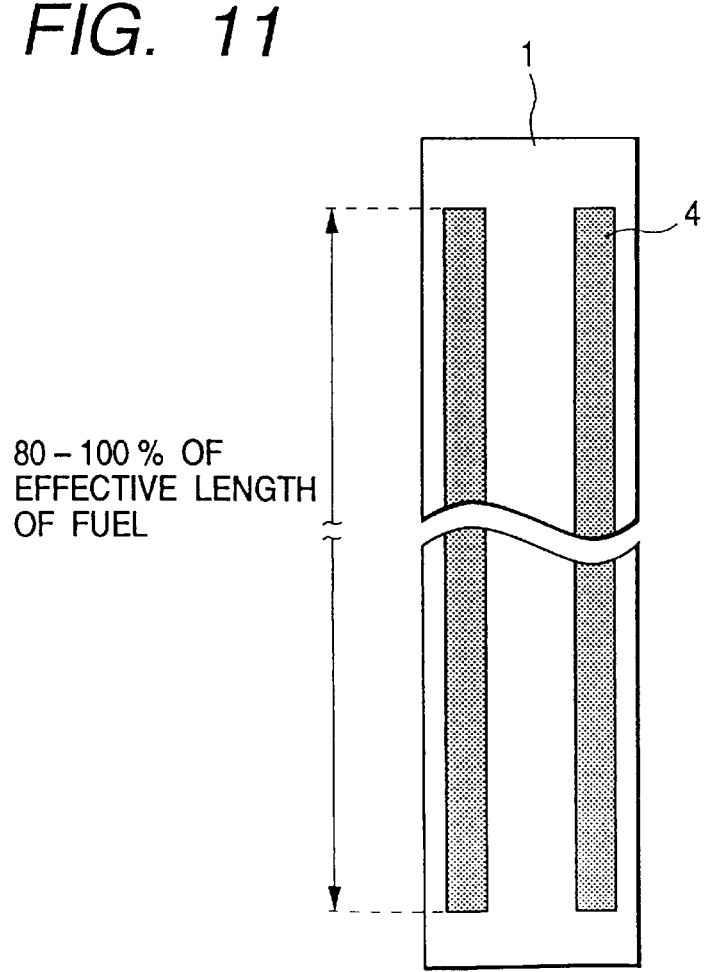
FIG. 11 is a side view showing a structure for arranging BP members of still another embodiment of the present invention in a channel box.

FIG. 11 shows a case where the width of a BP member 4 in the longitudinal direction of a channel box 1 is constant and the length of the BP member 4 in the longitudinal direction of the channel box 1 is 80 to 100% of the effective length of a fuel rod.

Figure 13:
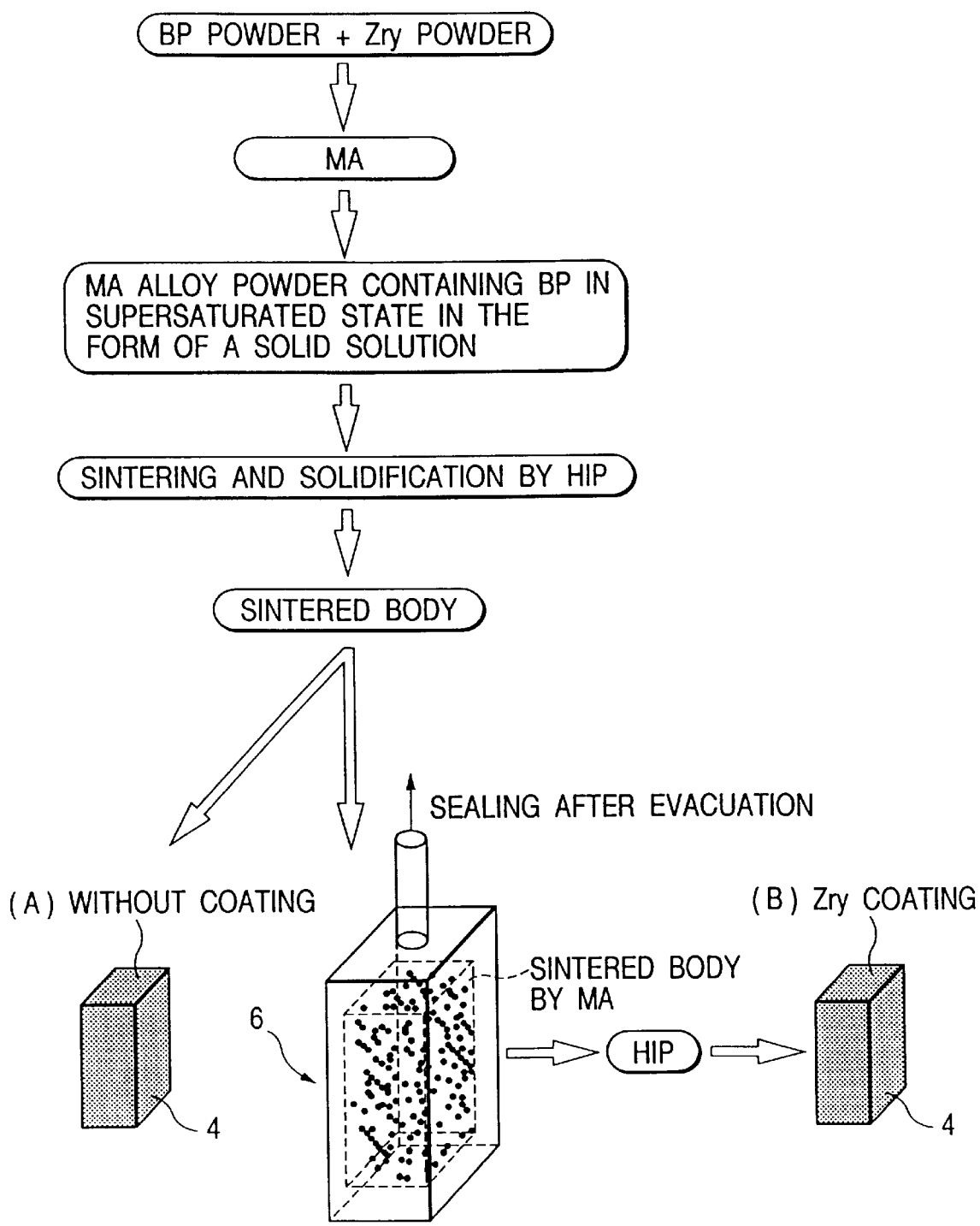
FIG. 13 is a block diagram showing a process for manufacturing a BP member of the present invention.
Figure 14:
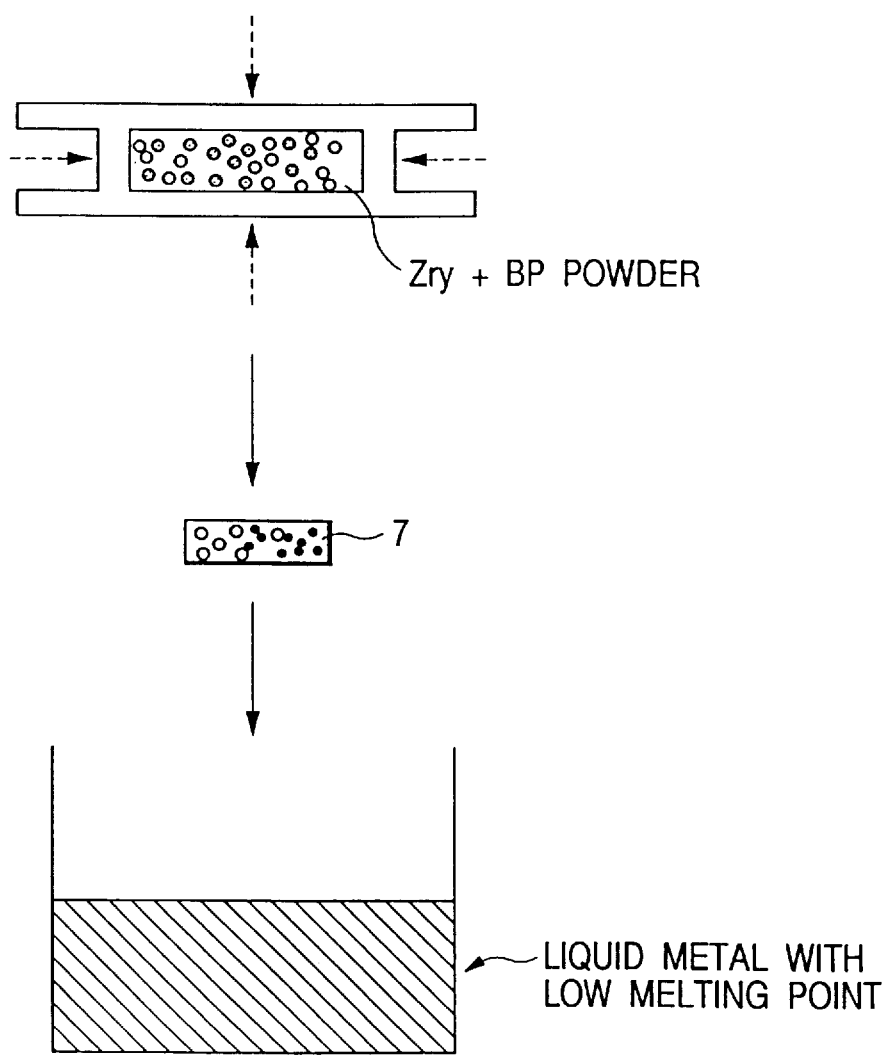
FIG. 14 is a block diagram showing a process for manufacturing another BP member of the present invention.

FIGS. 12 to 14 show a method for manufacturing a BP member 4. The BP member 4 contains at least one of cadmium (Cd), samarium (Sm), boron (B), gadolinium (Gd), silver (Ag), indium (In), and hafnium (Hf) and the element (s) is present in the form of one of metal, alloy, intermetallic compound, and ceramic. The content of BP metal in the BP member is required to be 2 to 8 wt. % based on the total weight of the channel box in the case of gadolinium in order to control the initial reactivity. Moreover, an example of an alloy composition when using Gd/Zry-4 alloy as a BP member, is tin: 1.20–1.70, iron: 0.18–0.24, chromium: 0.07–0.13, oxygen: 0.10–0.16, gadolinium: 5–80, and zirconium: the remainder (wt. %). In this case, the content of gadolinium depends on the size of a BP member or the number of BP members.

FIG. 12(1)(a) shows a method of forming a BP member 4 by putting Zry powder on a BP metal (Gd or Cd) with a melting point lower than that of Zry, heating the Zry powder up to the melting point of the BP metal in a vacuum state, and filling the voids of the Zry powder with the BP metal. FIG. 12(1)(b) shows a method of forming the BP member 4 by, contrarily, putting a BP metal with a melting point higher than that of Zry or BP oxide powder on a Zry plate or spongy zirconium, heating it up to a temperature (1,860° C.) equal to or higher than the melting point of Zr, and filling the voids of the BP powder with Zry.

FIG. 12(2)(a) shows a method of coating a BP plate with Zry by one of plating or vacuum evaporation and FIG. 12(2)(b) shows a method of coating a Zry plate with a BP metal by the other one of the methods.

FIG. 13 shows a process for manufacturing a BP block 4 coated with zircaloy. As shown in FIG. 13, BP powder and Zry powder is strongly treated by an MA (Mechanical Alloying) method to produce MA alloy powder containing BP (metal oxide) in a supersaturated state in the form of a solid solution. In the case of the MA method, a planetary ball mill P-5/4 made by Fritch is used and the revolving speed of a disk is kept at 200 rpm to perform the treatment for 100 to 150 hr at room temperature in an Ar-gas atmosphere. Thereafter, the produced MA alloy powder is sintered by a HIP (hot isostatic process) at 1,000° C. or higher to complete a sintered-body BP member 4 shown in FIG. 13(A). When further coating the sintered BP member 4 with zircaloy, it is possible to manufacture a BP block 4 coated with zircaloy shown in FIG. 13(B) by putting the sintered body in a vessel 6 made of Zry and vacuum-sealing it and thereafter, compacting it by a HIP. By using the mechanical alloying method, it is possible to produce zircaloy containing BP metal and BP oxide in a supersaturated state in the form of a solid solution in such a way that the contents of the BP metal and BP oxides are more than those at room temperature.

FIG. 14 shows a method of manufacturing a coated BP block 7 by compacting a powder, obtained by mixing Zry powder and BP metal powder or BP oxide powder to form it into a block and thereafter, dipping the block in the liquid of a proper metal with a low melting point.

Moreover, there is a method of alloying zirconium or zircaloy with a BP metal in addition to the above method of manufacturing the BP block 4. In this case, however, because the obtained alloy may be inferior to the existing zircaloy alloy in mechanical characteristics and corrosion resistance, it is necessary to improve the mechanical characteristics and corrosion resistance of the obtained alloy by adding an additional element to the alloy.

Furthermore, there is a method of making an alloy by precipitating a BP metal serving as an intermetallic compound in zircaloy. Cadmium, boron, silver, and indium are enumerated as BP metals for producing an intermetallic alloy with zirconium.

Though several embodiments of the present invention have been described above, the present invention is not restricted to the embodiments. Various modifications are allowed in design as long as they are not deviated from the gist of the present invention described in claims.

Figure 15A:
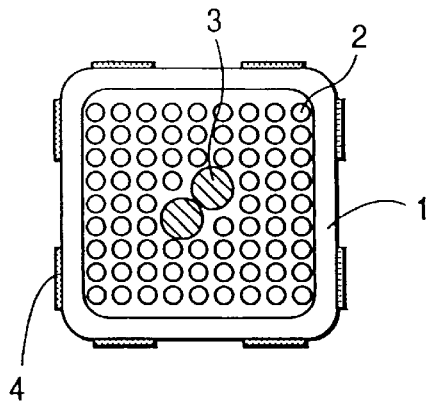
FIGS. 15(a) and 15(d) are a sectional view and a side view of a channel box for BP members (nearby the corners) of still another embodiment of the present invention.
Figure 15C:
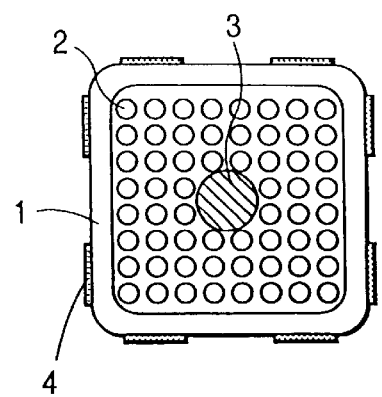
Figure 15B:
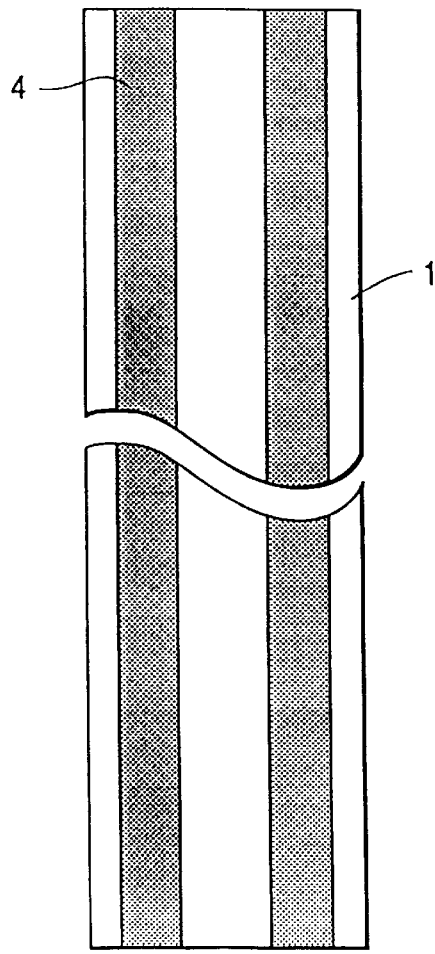
Figure 15D:
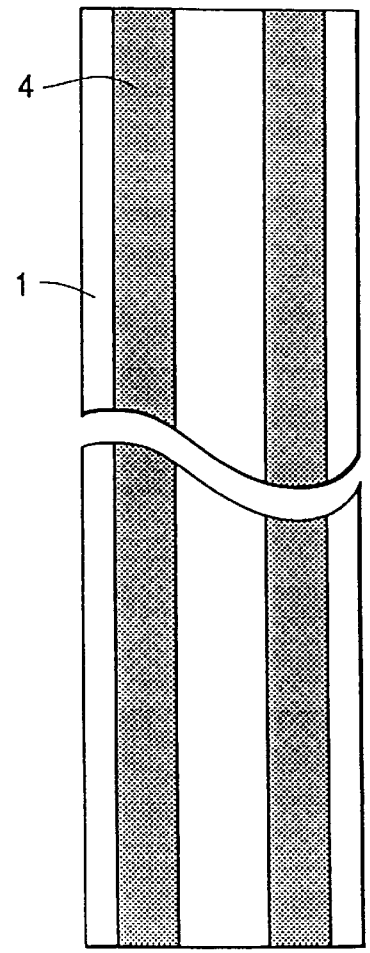
Figure 16A:
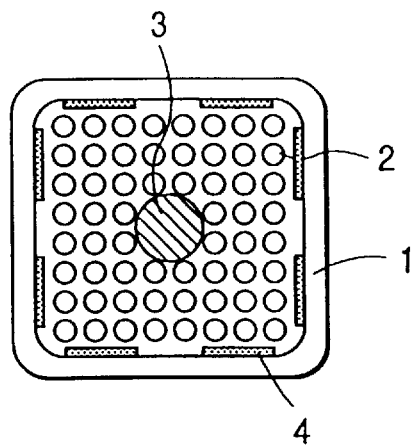
FIGS. 16(a) and 16(d) are a sectional view and a side view of a channel box for BP members of still another embodiment of the present invention.
Figure 16C:
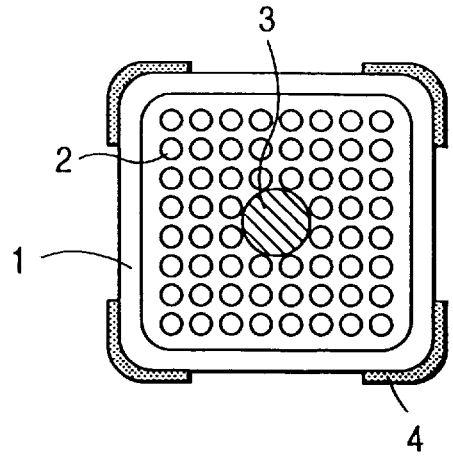
Figure 16B:
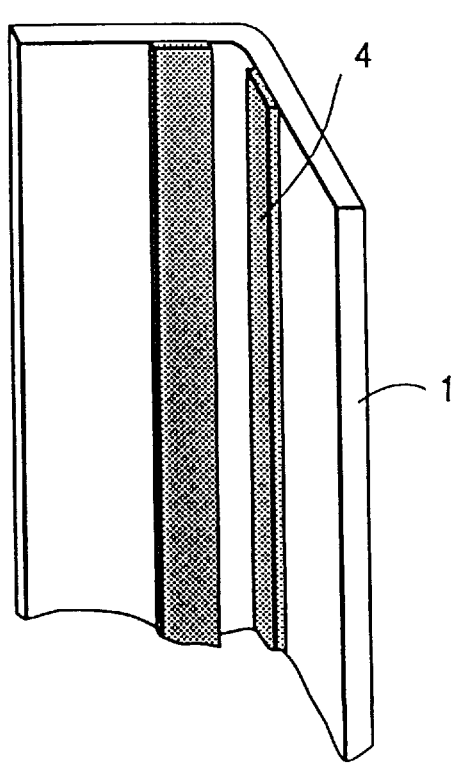
Figure 16D:
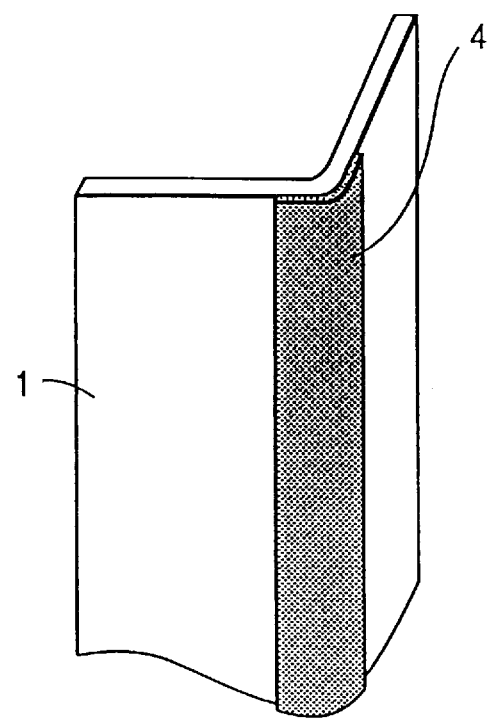

In addition to the means for embedding the above BP members 4 in the channel box 1, there is the following method. That is, as shown in FIGS. 15(a) and 15(b), when using the BP members 4 coated with another metal, means for attaching the BP members 4 to the laterals of the channel box 1 instead of embedding it can be used. FIGS. 15(a) and 15(b) show cases in which the above coated BP members 4 are arranged nearby the corners of the inner laterals of the channel box 1 in its longitudinal direction. FIG. 16(a) shows a case in which the coated BP members 4 are arranged nearby the corners of the outer laterals of the channel box 1 in its longitudinal direction and FIG. 16(b) shows a case in which the BP members 4 are arranged at the corners of the outer laterals of the channel box 1 in its longitudinal direction.

Figure 17A:
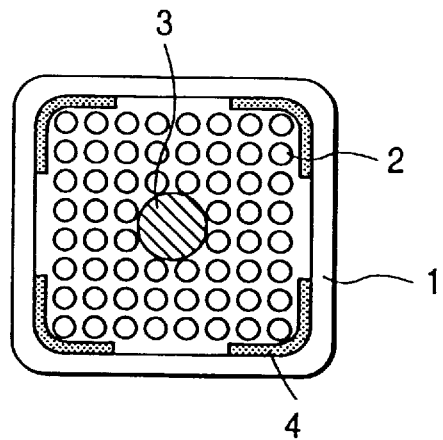
FIGS. 17(a) and (b) include a sectional view and a side view of a channel box for BP members of still another embodiment of the present invention.
Figure 17B:
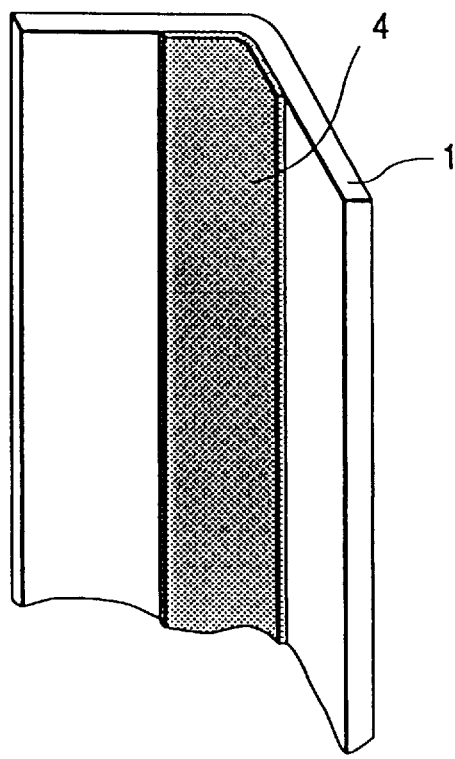
Figure 18A:
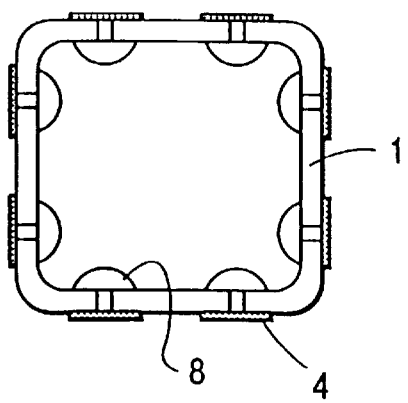
FIGS. 18(a) and 18(d) are a sectional view and a side view showing a structure for attaching BP members of the present invention to a channel box.
Figure 18C:
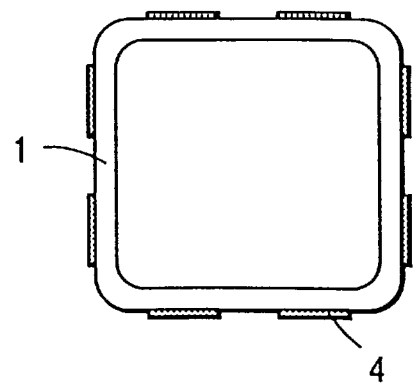
Figure 18B:
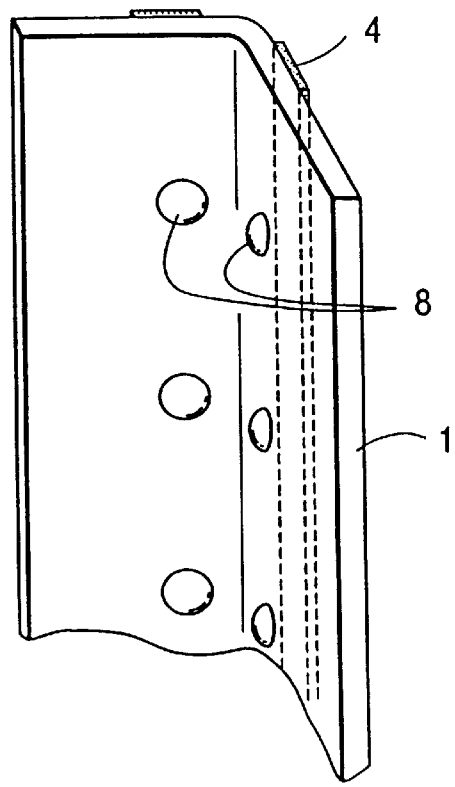
Figure 18D:
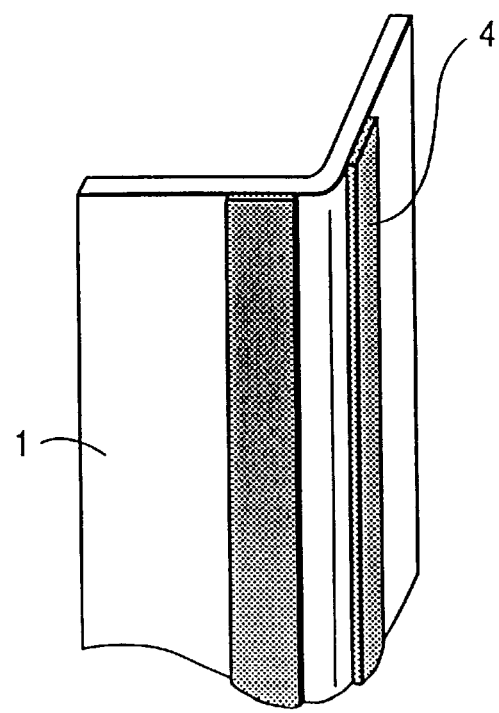

Moreover, FIGS. 17(a) and 17(b) show a case in which the coated BP members 4 are arranged at the corners of the inner laterals of the channel box 1 in its longitudinal direction. FIGS. 18(a) and 18(b) show methods for attaching the BP members 4 to the channel box 1. FIG. 18(a) shows a method for attaching the BP members 4 by using rivets 8 made of zircaloy or stainless steel. In this case, it is possible to attach the BP members 4 to the inside or outside of the channel box 1 with rivets 8. FIG. 18(b) shows a method for directly welding the coated BP members 4 to the laterals of the channel box 1.

Figure 19:
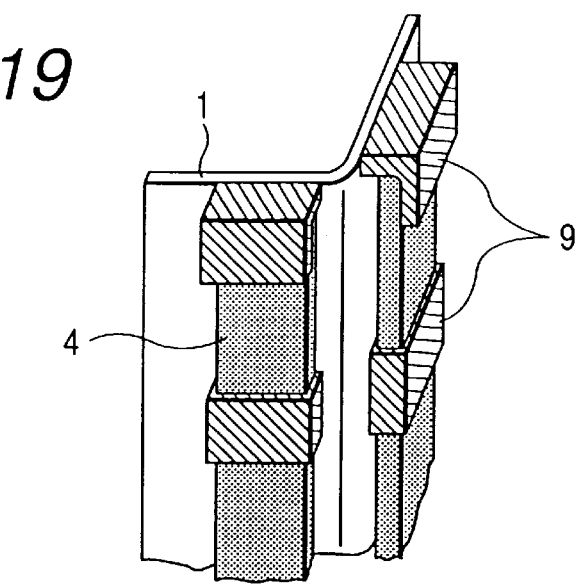
FIG. 19 is a sectional side view showing another structure for attaching BP members of the present invention to a channel box.

Furthermore, FIG. 19 shows a method for attaching the coated BP members 4 by fixtures 9 made of zircaloy or stainless steel.

Figure 20:
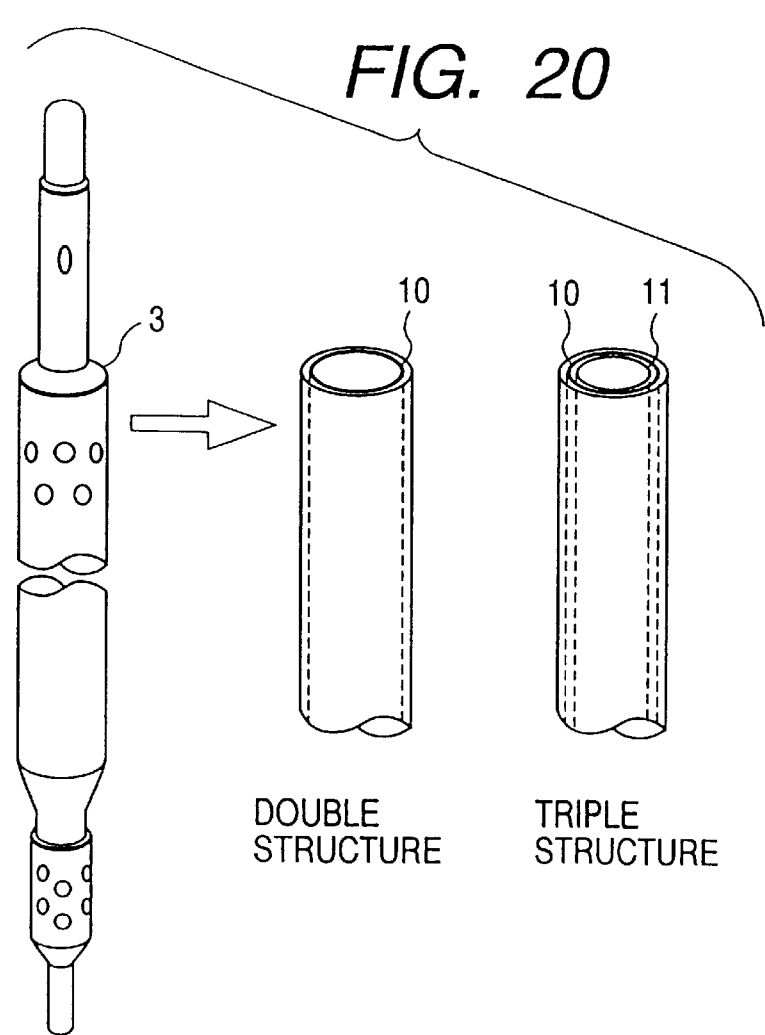
FIG. 20 is a perspective view showing a structure for attaching BP members of the present invention to a water rod.

FIG. 20 shows a case in which the coated BP members 4 are arranged in a water rod 3. As shown in FIG. 20, there are two cases: one case in which a tube 10 made of coated BP metal is placed in the water rod 3 to form a double structure, and the other case in which a tube 11 made of Zry is placed further inside of the BP metal tube 10 to form a triple structure.

Figure 21A:
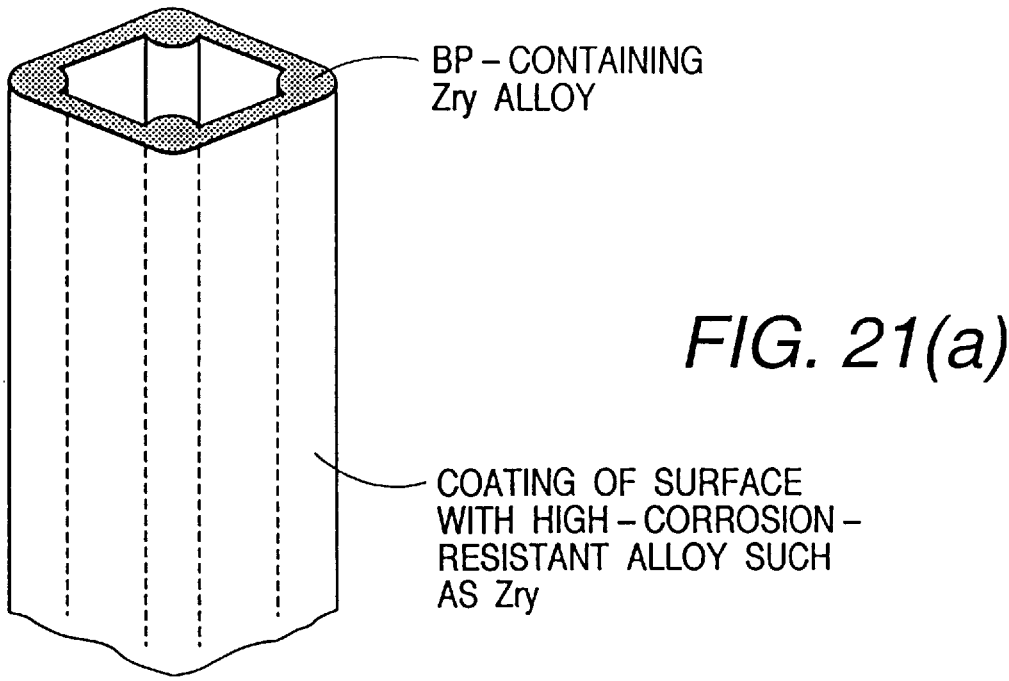
FIGS. 21(a) and 21(b) are a perspective view showing a channel box made of a zirconium alloy containing BP of the present invention.
Figure 21B:
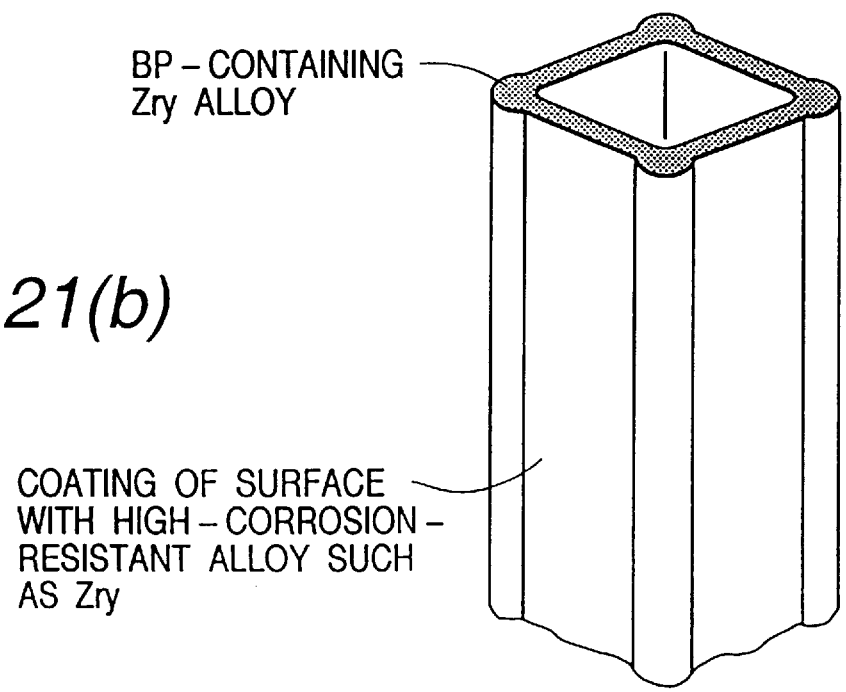
Figure 22:
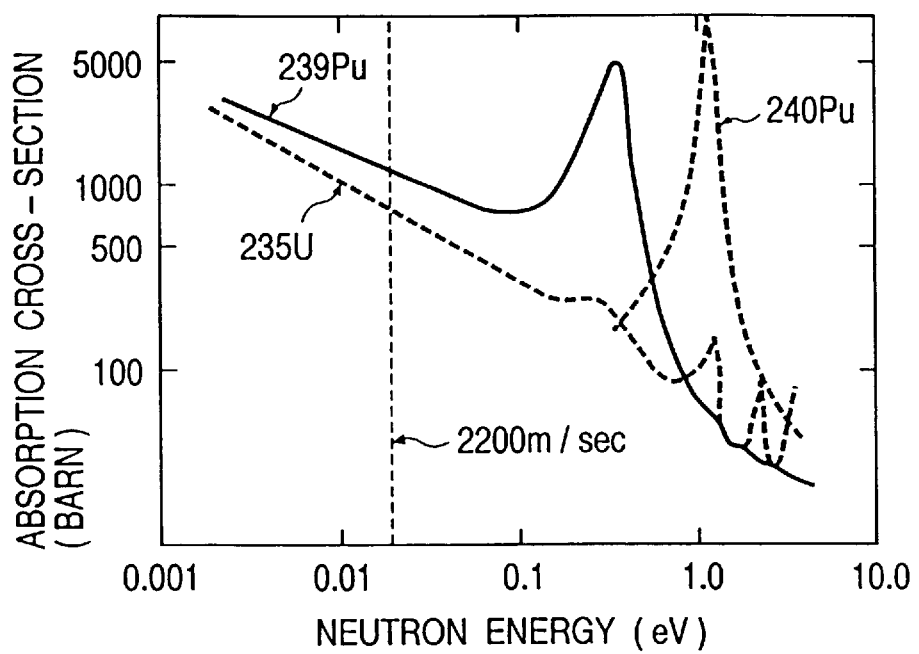
FIG. 22 is a diagram for comparison of the dependences of the absorption cross-sections of uranium and plutonium on the neutron energy.
Figure 23:
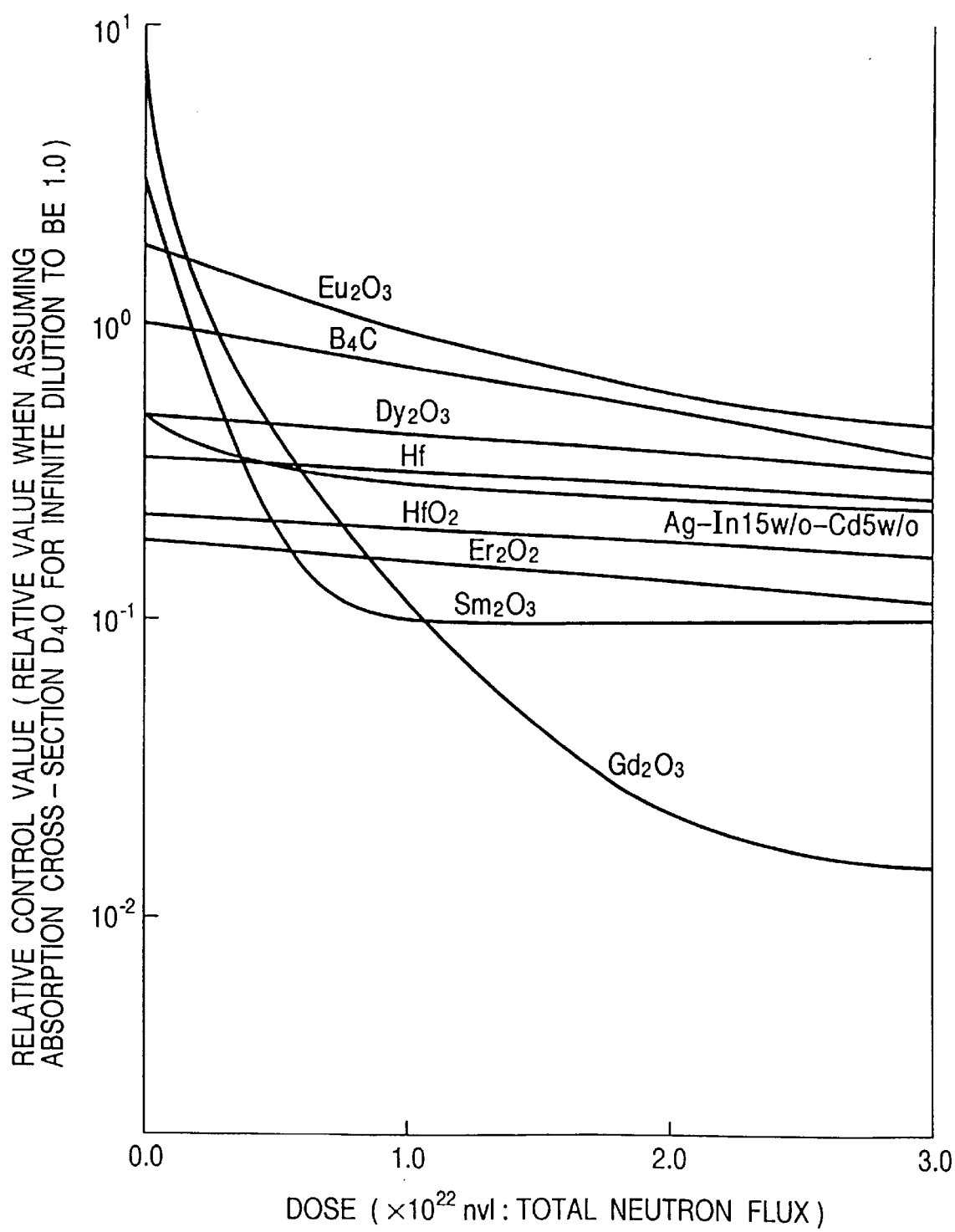
FIG. 23 is an illustration showing the change of control value with the neutron dose.
Figure 24:
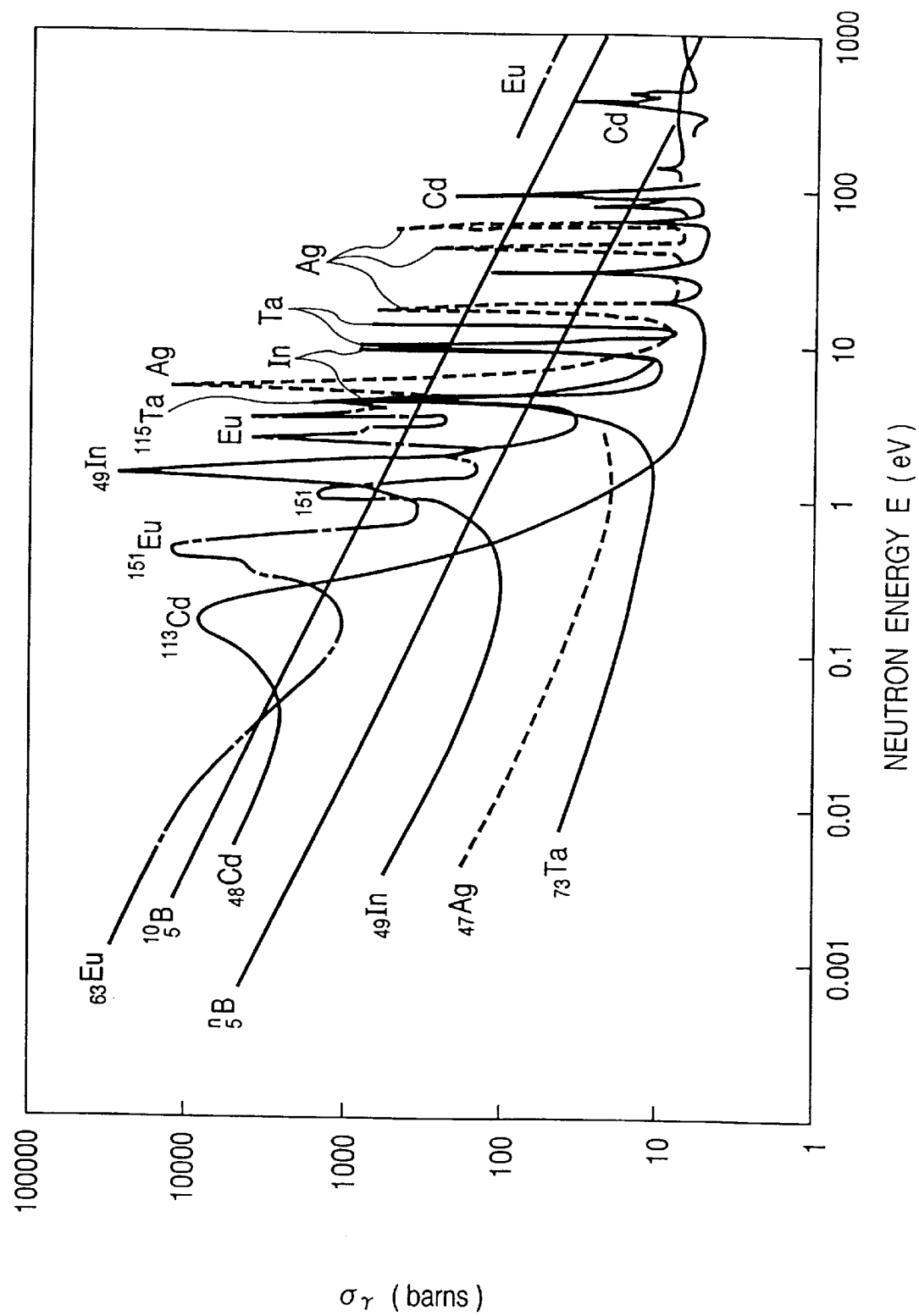
FIG. 24 is a diagram showing the relationship between the neutron absorption cross-sections of burnable poison and neutron absorber and the neutron energy.
Figure 25A:
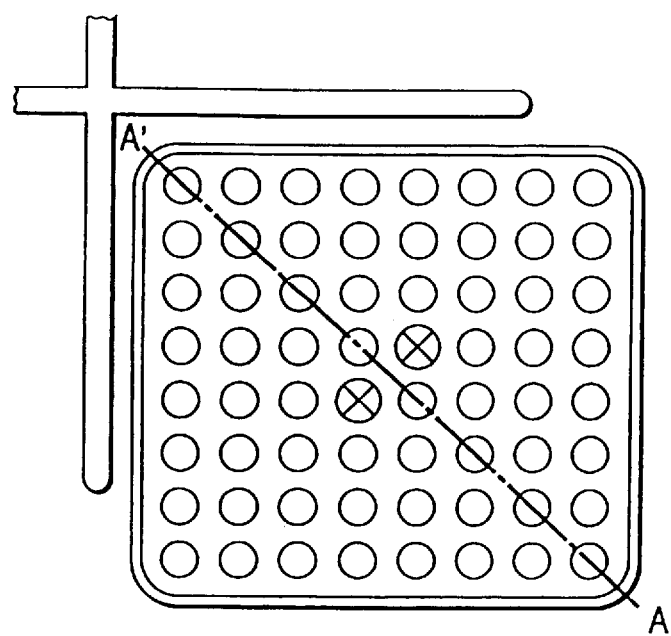
FIGS. 25(a) and 25(b) are thermal neutron flux distribution diagrams in a fuel assembly.
Figure 25B:
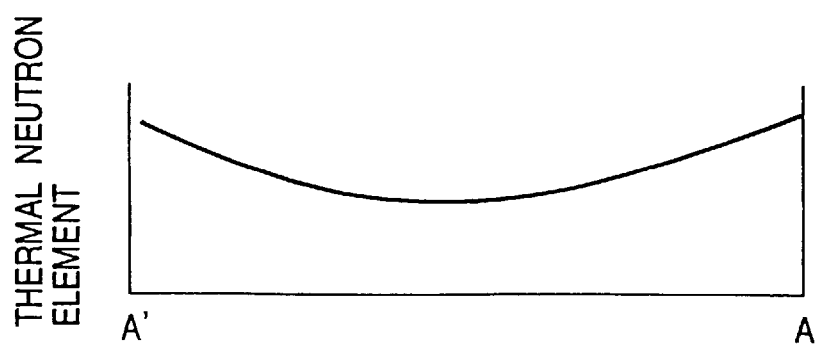

FIGS. 21(a) and 21(b) show a channel box 1 made of a Zry alloy containing BP. The shape of the channel box 1, as shown in FIGS. 21(a) and 21(b), makes it possible to effectively control the local peaking coefficient of the corners of a fuel assembly and moreover, simultaneously control the swelling of the corners of the channel box 1 due to creep deformation caused by irradiation with neutrons, by increasing the thickness of the corner. Moreover, by coating the surface of the channel box 1 with a high-corrosionresistant alloy made of Zry containing no BP, it is possible to prevent burnable poison from directly contacting with reactor water and improve the corrosion resistance. An example of the composition of the Gd/Zry-4 alloy with which the whole of a channel box is fabricated, is tin: 1.20–1.70, iron: 0.18–0.24, chromium: 0.07–0.13, oxygen: 0.10–0.16, gadolinium: 2.0–8.0, and zirconium: the remainder (wt. %).

What is claimed is:

1. A fuel assembly provided with a fuel rod bundle in which a plurality of nuclear fuel rods containing uranium or plutonium are arranged in a channel box enclosing the fuel rod bundle, wherein a sheet of burnable poison comprised of a metal, an alloy or an intermetallic compound is integrally joined and embedded in a zirconium based alloy plate, of which said channel box is constituted, and a plurality of said sheets of said burnable poison are arranged in the periphery of said channel box.

2. A fuel assembly provided with a fuel rod bundle in which a plurality of nuclear fuel rods containing uranium or plutonium are arranged in a channel box enclosing the fuel rod bundle, wherein a plurality of sheets of burnable poison, each comprised of metal, an alloy or an intermetallic compound coated with a metal having a corrosion resistance, are arranged on the walls of said channel box.

3. A fuel assembly provided with a fuel rod bundle in which a plurality of fuel rods containing uranium or plutonium are arranged in a channel box enclosing the fuel rod bundle and a water rod provided in the fuel rod bundle, wherein burnable poison is provided on the water rod and the burnable poison is coated with metal having a corrosion resistance and a sheet of burnable poison comprised of a metal, an alloy or an intermetallic compound is integrally joined and embedded in a zirconium based alloy plate, of which said channel box is constituted, and a plurality of said sheets of said burnable poison are arranged in the periphery of said channel box.

4. The fuel assembly according to claim 1, wherein the burnable poison is made of metal, alloy, intermetallic compound, or ceramic.

5. The fuel assembly according to claim 1, wherein the burnable poison is made of metal, alloy, or intermetallic compound, or ceramic containing at least one of cadmium, samarium, boron, gadolinium, silver, indium, and hafnium.

6. The fuel assembly according to claim 1, wherein the burnable poison is made of metal, alloy, intermetallic compound, or ceramic obtained by adding at least one of cadmium, samarium, boron, gadolinium, silver, indium, and hafnium to zirconium or zirconium-base alloy as an alloying element and forming a solid solution containing the added element in a dispersed or supersaturated state in the form of at least one of metal, intermetallic compound, oxide, hydride, and nitride.

7. The fuel assembly according to claim 1, wherein the burnable poison is made by adding at least one of cadmium, samarium, boron, gadolinium, silver, indium, and hafnium to zirconium or zirconium-group alloy as an alloying element and forming a solid-solution containing the added element in a dispersed or supersaturated state in the form of at least one of metal, intermetallic compound, oxide, hydride, and nitride.

8. The fuel assembly according to claim 1, wherein the burnable poison is more arranged nearby the corner in the cross section of the channel box viewed from its longitudinal direction.

9. The fuel assembly according to claim 8, wherein the burnable poison is symmetrically arranged in the cross section of the channel box viewed from its longitudinal direction.

10. The fuel assembly according to claim 1, wherein the burnable poison is unevenly arranged in the longitudinal direction of the channel box.

11. The fuel, assembly according to claim 10, wherein the burnable poison is more arranged at the bottom of the channel box and less arranged at the top in the longitudinal direction of the channel box.

12. A fuel assembly provided with a fuel rod bundle in which a plurality of nuclear fuel rods containing uranium or plutonium are arranged in a channel box enclosing the fuel rod bundle, wherein a sheet of burnable poison comprised of a metal, an alloy or an intermetallic compound is integrally joined and embedded in a zirconium based alloy plate, of which said channel box is constituted, and a plurality of said sheets of said burnable poison are positioned in the periphery of said channel box and said sheets of burnable poison are so provided as to face a region of 80% or more of the effective length of the fuel rods.

13. A fuel assembly according to claim 12, wherein said sheets of burnable poison contain 5 wt. % or more of at least one of cadmium, samarium, boron, gadolinium, silver, indium, and hafnium.

14. The fuel assembly according to claim 2, wherein the burnable poison is made of metal, alloy, intermetallic compound, or ceramic.

15. The fuel assembly according to claim 3, wherein the burnable poison is made of metal, alloy, intermetallic compound, or ceramic.

16. The fuel assembly according to claim 2, wherein the burnable poison is made of metal, alloy, or intermetallic compound, or ceramic containing at least one of cadmium, samarium, boron, gadolinium, silver, indium, and hafnium.

17. The fuel assembly according to claim 3, wherein the burnable poison is made of metal, alloy, or intermetallic compound, or ceramic containing at least one of cadmium, samarium, boron, gadolinium, silver, indium, and hafnium.

18. The fuel assembly according to claim 2, wherein the burnable poison is made of metal, alloy, intermetallic compound, or ceramic obtained by adding at least one of cadmium, samarium, boron, gadolinium, silver, indium, and hafnium to zirconium or a zirconium-base alloy as an alloying element and forming a solid solution containing the added element in a dispersed or supersaturated state in the form of at least one of metal, intermetallic compound, oxide, hydride, and nitride.

19. The fuel assembly according to claim 3, wherein the burnable poison is made of metal, alloy, intermetallic compound, or ceramic obtained by adding at least one of cadmium, samarium, boron, gadolinium, silver, indium, and hafnium to zirconium or a zirconium-base alloy as an alloying element and forming a solid solution containing the added element in a dispersed or supersaturated state in the form of at least one of metal, intermetallic compound, oxide, hydride, and nitride.

20. The fuel assembly according to claim 2, wherein the burnable poison is made by adding at least one of cadmium, samarium, boron, gadolinium, silver, indium, and hafnium to a zirconium or zirconium-group alloy as an alloying element and forming a solid-solution containing the added element in a dispersed or supersaturated state in the form of at least one of metal, intermetallic compound, oxide, hydride, and nitride.

21. The fuel assembly according to claim 3, wherein the burnable poison is made by adding at least one of cadmium, samarium, boron, gadolinium, silver, indium, and hafnium to a zirconium or zirconium-group alloy as an alloying element and forming a solid-solution containing the added element in a dispersed or supersaturated state in the form of at least one of metal, intermetallic compound, oxide, hydride, and nitride.

22. The fuel assembly according to claim 2, wherein the burnable poison is unevenly provided in the cross section of the channel box viewed from its longitudinal direction.

23. The fuel assembly according to claim 2, wherein the burnable poison is more arranged nearby the corner in the cross section of the channel box viewed from its longitudinal direction.

24. The fuel assembly according to claim 2, wherein the burnable poison is unevenly arranged in the longitudinal direction of the channel box.

25. The fuel assembly according to claim 9, wherein the burnable poison is unevenly arranged in the longitudinal direction of the channel box.

26. A fuel assembly provided with a fuel rod bundle in which a plurality of nuclear fuel rods containing uranium or plutonium are arranged in a channel box enclosing the fuel rod bundle, wherein a sheet of burnable poison comprised of a metal, an alloy or an intermetallic compound is embedded in a zirconium based alloy plate constituting said channel box, and is hot-rolled and repeatedly cold-rolled and annealed to integrate said sheet of said burnable poison with said zirconium based alloy plate, and a plurality of said sheets of said burnable poison are arranged in periphery of said channel box.

* * * * *